(12) United States Patent
Okumura

(10) Patent No.: US 9,081,218 B2
(45) Date of Patent: Jul. 14, 2015

(54) LIQUID CRYSTAL DISPLAY DEVICE

(75) Inventor: Hiroshi Okumura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 13/807,405

(22) PCT Filed: Apr. 20, 2011

(86) PCT No.: PCT/JP2011/059739
§ 371 (c)(1),
(2), (4) Date: Dec. 28, 2012

(87) PCT Pub. No.: WO2012/005044
PCT Pub. Date: Jan. 12, 2012

(65) Prior Publication Data
US 2013/0107152 A1 May 2, 2013

(30) Foreign Application Priority Data

Jul. 8, 2010 (JP) ................................. 2010-155759

(51) Int. Cl.
G09G 3/36 (2006.01)
G02F 1/133 (2006.01)

(52) U.S. Cl.
CPC .......... G02F 1/13306 (2013.01); G09G 3/3677 (2013.01); *G09G 2310/067* (2013.01); *G09G 2320/0219* (2013.01); *G09G 2320/0233* (2013.01)

(58) Field of Classification Search
CPC .......... G09G 3/3677; G09G 2310/067; G09G 2320/0233; G09G 2320/0219; G02F 1/13306
See application file for complete search history.

(56) References Cited

U.S. PATENT DOCUMENTS

| 5,606,342 A | 2/1997 | Shoji et al. |
| 6,359,607 B1 | 3/2002 | Yanagi et al. |
| 8,487,864 B2 * | 7/2013 | Itoh ............................... 345/103 |
| 2007/0216632 A1 | 9/2007 | Lee |
| 2008/0122768 A1 * | 5/2008 | Jung et al. ........................ 345/87 |
| 2009/0289884 A1 | 11/2009 | Yanagi et al. |
| 2010/0141850 A1 | 6/2010 | Itoh |
| 2010/0245333 A1 * | 9/2010 | Hsu et al. ....................... 345/213 |

FOREIGN PATENT DOCUMENTS

| JP | 05-046128 A | 2/1993 |
| JP | 06-110035 A | 4/1994 |
| JP | 11-281957 A | 10/1999 |
| JP | 2001-125069 A | 5/2001 |
| JP | 2007-156080 A | 6/2007 |
| JP | 2007-256916 A | 10/2007 |
| WO | 2007/052408 A1 | 5/2007 |
| WO | 2009/022486 A1 | 2/2009 |
| WO | WO 2009022486 A1 * | 2/2009 |

OTHER PUBLICATIONS

Official Communication issued in International Patent Application No. PCT/JP2011/059739, mailed on May 24, 2011.

* cited by examiner

*Primary Examiner* — Lixi C Simpson
(74) *Attorney, Agent, or Firm* — Keating & Bennett, LLP

(57) ABSTRACT

A liquid crystal display device (1) includes: a plurality of groups of scanning lines (Gia) and (Gib) via which gate signals are outputted to a plurality of pixels (PIX); and scanning line driving circuits (5a) and (5b) which generate the gate signals and which are disposed for each separate one of a plurality of groups of scanning lines (Gia) and (Gib), the liquid crystal display device (1) further including potential control circuits (15a) and (15b), placed in front of the scanning line driving circuits (5a) and (5b), respectively which incline, for each separate one of the groups of scanning lines (Gia) and (Gib), falling edges of high-potential signals (VGH1) and (VGH2) in accordance with which the gate signals are generated and which are composed of pulse waves. This prevents luminance unevenness from occurring in each display region.

8 Claims, 12 Drawing Sheets

LIQUID CRYSTAL DISPLAY DEVICE

TECHNICAL FIELD

The present invention relates to a liquid crystal display device capable of controlling the inclination of a falling edge of a scanning signal.

BACKGROUND ART

In recent years, large-sized liquid crystal display panels have been under development. A large-sized liquid crystal display panel may exhibit symptoms of a partial difference in luminance within the liquid crystal display panel when, in an inspecting step at a manufacturing stage, the liquid crystal display panel displays a screen image for inspection (so-called "solid screen image") of the same low-tone color (hereinafter such symptoms being referred to as "luminance unevenness").

The occurrence of such luminance unevenness in a large-sized panel is due to the fact that production tolerance within a liquid crystal display panel, such as variations in line width and film thickness within a TFT substrate, tends to occur in a plane of a single liquid crystal display panel and variations in gradation due to TFT characteristics and/or parasitic capacitances on wires occur with an in-plane distribution. In particular, a panel based on divisional driving may prominently exhibit luminance unevenness.

Patent Literature 1 discloses dividing a display panel into a plurality of regions and controlling a gate pulse width for each of the regions divided from each other, in order that the display panel is prevented from exhibiting luminance unevenness.

FIG. 7 is a diagram schematically showing the locations of a display panel 100, a scanning driver 120, and a signal driver 130 as described in Patent Literature 1.

The display panel 100 has its display region divided into three regions A, B, and C arranged in the order of decreasing distance from the scanning driver 120 along a column-wise direction. The scanning driver 120 applies scanning signals $G_1$ to $G_m$ to scanning lines of the region A, applies scanning signals $G_{m+1}$ to $G_{2m}$ to scanning lines of the region B, and applies scanning signals $G_{2m+1}$ to $G_{3m}$ to scanning lines of the region C.

FIG. 8 is a diagram showing the waveforms of the scanning signals G that are applied to the scanning lines of the display panel 100.

As shown in FIG. 8, the pulse width Wb of each of the scanning signals $G_{m+1}$ to $G_2$ that are applied to the scanning lines of the region B is smaller than the pulse width Wa of each of the scanning signals $G_1$ to $G_m$ that are applied to the scanning lines of the region A. Furthermore, the pulse width Wc of each of the scanning signals $G_{2m+1}$ to $G_3$ that are applied to the scanning lines of the region C is smaller than the pulse width Wb of each of the scanning signals $G_{m+1}$ to $G_2$ that are applied to the scanning lines of the region B.

FIG. 9 is a diagram showing examples of waveforms of the scanning signals G that are applied to each separate pixel of the display panel 100.

FIG. 9 shows the waveform of a signal that is applied to each scanning line Lg of the region A, the waveform of a signal that is applied to each scanning line Lg of the region B, and the waveform of a signal that is applied to each scanning line Lg of the region C, starting from the top. It should be noted that each of the dotted lines indicates the waveform of a scanning signal G at the point in time where the scanning signal G was outputted from the scanning driver 120.

By thus setting, for each of the regions A, B, and C into which the display panel 100 has been divided, the pulse width Wa, Wb, or Wc of each of the scanning signals G that are applied to the scanning lines of that region, periods of time ta, tb, and tc during which the TFT of each separate display pixel of the display panel 100 carries out an ON operation are made substantially equal.

This causes display signal voltages to be applied to each separate display pixel for substantially uniform periods of time, thus preventing deterioration in image quality of a display image from occurring due to a biased wiring load.

Patent Literature 2 discloses a liquid crystal display device which forms, in at least either of a rising or a falling edge portion of a pulse wave that drives a signal line or a scanning line, a region of a level value that is lower than a peak value of the pulse wave. This prevents display unevenness from occurring due to a distortion of a pulse wave along with inversion or the like.

Patent Literature 3 discloses a liquid crystal display device which, by inclining the waveform of a falling edge portion of a scanning signal, makes it harder for the waveform of the falling edge portion of the scanning signal to be distorted.

FIG. 10 is a diagram showing a configuration of the liquid crystal display device of Patent Literature 3.

As shown in FIG. 10, the liquid crystal display device 400 includes a liquid crystal display panel 401, picture signal lines 5400, scanning signal lines G400, picture signal line driving circuits 200-1 and 200-2, scanning signal line driving circuits 300-1 to 300-3, and a control circuit 600.

FIG. 11 is a diagram showing the waveforms of signals that are outputted from the picture signal line driving circuits 200-1 and 200-2, the scanning signal line driving circuits 300-1 to 300-3, and the control circuit 600.

FIG. 12 is a diagram showing a configuration of the scanning signal line driving circuits 300-1 to 300-3.

The control circuit 600 generates a clock signal GCK 400 and a periodic signal Stc400 in accordance with which the picture signal line driving circuits 200-1 and 200-2 and the scanning signal line driving circuits 300-1 to 300-3 operate.

Each of the picture signal line driving circuits 200-1 and 200-2 uses the clock signal GCK400 to apply, to the picture signal lines 5400, a picture signal supplied from an outside source. Each of the scanning signal line driving circuits 300-1 to 300-3 uses the clock signal GCK400 and the periodic signal Stc400 to generate a scanning signal VG400 and apply it to the scanning signal lines G400.

The scanning signal line driving circuit 300-1 includes an internal modulation section 310-1 and a scanning signal line driving section 315-1. The internal modulation section 310-1 generates a driving signal VM100 in accordance with a potential Vgh and an intermediate signal Vct400. The scanning signal line driving section 315-1 generates a scanning signal VG400 in accordance with the driving signal VM400 generated by the internal modulation section 310-1.

The inclination of a falling edge portion of the scanning signal VG400 makes it harder for a falling edge of the scanning signal VG400 to be distorted, thus preventing deterioration in display quality.

Furthermore, the scanning signal line driving circuits 300-1 to 300-3 have their internal wires connected to one another via a signal wire 305. This allows averaging of the waveforms of the driving signals VM100 to 300 that are applied to the internal wires, respectively. That is, this allows the driving signals VM100 to VM300 to have their respective sloping parts to be substantially equal in inclination to one another. This prevents display quality from varying from one display area to another.

CITATION LIST

Patent Literature 1

Japanese Patent Application Publication, Tokukai, No. 2007-156080 A (Publication Date: Jun. 21, 2007)
Patent Literature 2
Japanese Patent Application Publication, Tokukaihei, No. 5-46128 A (Publication Date: Feb. 26, 1993)
Patent Literature 3
International Publication No. WO 2007/052408 A1 (Publication Date: May 10, 2007)

SUMMARY OF INVENTION

Technical Problem

However, Patent Literature 1 is intended to change a gate pulse width per se, but cannot make it possible to adjust a falling edge of a gate signal (scanning signal).

Patent Literature 2 cannot make it possible to adjust a distortion of a pulse wave for each region of the display panel, and therefore cannot make it possible to prevent luminance unevenness for each region of the display panel.

By connecting the plurality of scanning signal line driving circuits 300-1 to 300-3 to one another via the signal wire 305, Patent Literature 3 can make it possible to suppress variations among the driving signals VM100 to VM300 generated by the respective driving circuits. However, Patent Literature 3 cannot make it possible to prevent luminance unevenness from occurring due to in-plane variations such as parasitic capacitances in the liquid crystal display panel 401.

Especially, in the case of a large-sized display panel, production tolerance within a liquid crystal display panel occurs in a plane of a single liquid crystal display panel, so that variations in gradation may occur with an in-plane distribution. Especially, in the case of a panel based on divisional driving, such variations in gradation tend to be seen as luminance unevenness at an end face of the panel.

In this case, since the panel characteristics of variations in gradation have an in-plane distribution, such a problem arises that even adjustment of the inclination of a falling edge portion of the scanning signal VG400 by the liquid crystal display device 400 merely results in a shift in the inclination of the falling edge portion of the scanning signal VG400 in the liquid crystal display panel 401 as a whole and cannot lead to a reduction in variations in gradation (i.e., luminance unevenness) in a plane of the liquid crystal display panel 401.

The present invention has been made in order to solve the foregoing problems, and it is an object of the present invention to prevent the occurrence of luminance unevenness in each display region by adjusting a falling edge of a scanning signal for each group of scanning lines.

Solution to Problem

In order to solve the foregoing problems, a liquid crystal display device of the present invention includes: scanning line driving sections which generate scanning signals; and a plurality of scanning lines via which the scanning signals generated by the scanning line driving sections are outputted to a plurality of pixels, the scanning line driving sections being disposed for each separate one of a plurality of groups of scanning lines which constitute the plurality of scanning lines, the liquid crystal display device further comprising potential control circuits which incline, for each separate one of the groups of scanning lines, falling edges of scanning signal generating signals in accordance with which the scanning signals are generated, the potential control circuits being placed in front of the scanning line driving sections, respectively, the scanning signal generating signals being composed of pulse waves.

According to the foregoing configuration, the scanning line driving sections are disposed for each separate one of a plurality of groups of scanning lines which constitute the plurality of scanning lines. This makes it possible to reduce the number of scanning lines that are driven by a single scanning line driving section, thus making it possible to prevent distortion of falling edges of gate signals that are outputted to the scanning lines.

According to the foregoing configuration, the liquid crystal display device includes potential control circuits which incline falling edges of scanning signal generating signals in accordance with which the scanning signals are generated, the potential control circuits being placed in front of the scanning line driving sections, respectively, the scanning signal generating signals being composed of pulse waves.

This allows the scanning line driving sections to acquire the scanning signal generating signals composed of pulse waves whose falling edges have been inclined by the slope adjustment circuits. Then, the scanning line driving sections generate scanning signals from the scanning signal generating signals thus acquired. For this reason, the shapes of pulse waves of the scanning signals generated by the scanning line driving sections are also shapes having inclined falling edges. Thus, the scanning signals generated by the scanning line driving sections have the shapes of pulse waves whose falling edges are inclined, and as such, can make it harder for the falling edges to be distorted.

Further, the slope adjustment circuits incline the falling edges of the scanning signal generating signals for the groups of scanning lines, respectively. For this reason, the slopes of the falling edges of the scanning signal generating signals can be optimized in accordance with parasitic capacitors and the like that are formed in each of the plurality of groups of scanning lines. This makes it possible to prevent a sloping part of a falling edge of a gate signal that is outputted to each scanning line from varying between the groups of scanning lines.

Thus, a liquid crystal display device can be provided which prevents the occurrence of luminance unevenness in each display region by adjusting a falling edge of a scanning signal for each group of scanning lines.

Advantageous Effects of Invention

A liquid crystal display device of the present invention includes: scanning line driving sections which generate scanning signals; and a plurality of scanning lines via which the scanning signals generated by the scanning line driving sections are outputted to a plurality of pixels, the scanning line driving sections being disposed for each separate one of a plurality of groups of scanning lines which constitute the plurality of scanning lines, the liquid crystal display device further comprising potential control circuits which incline, for each separate one of the groups of scanning lines, falling edges of scanning signal generating signals in accordance with which the scanning signals are generated, the potential control circuits being placed in front of the scanning line driving sections, respectively, the scanning signal generating signals being composed of pulse waves.

This brings about an effect of making it possible to provide a liquid crystal display device which prevents the occurrence of luminance unevenness in each display region by adjusting a falling edge of a scanning signal for each group of scanning lines.

DESCRIPTION OF EMBODIMENTS

An embodiment of the present invention is described in detail below.

(Configuration of a Liquid Crystal Display Device)

Figure 1:
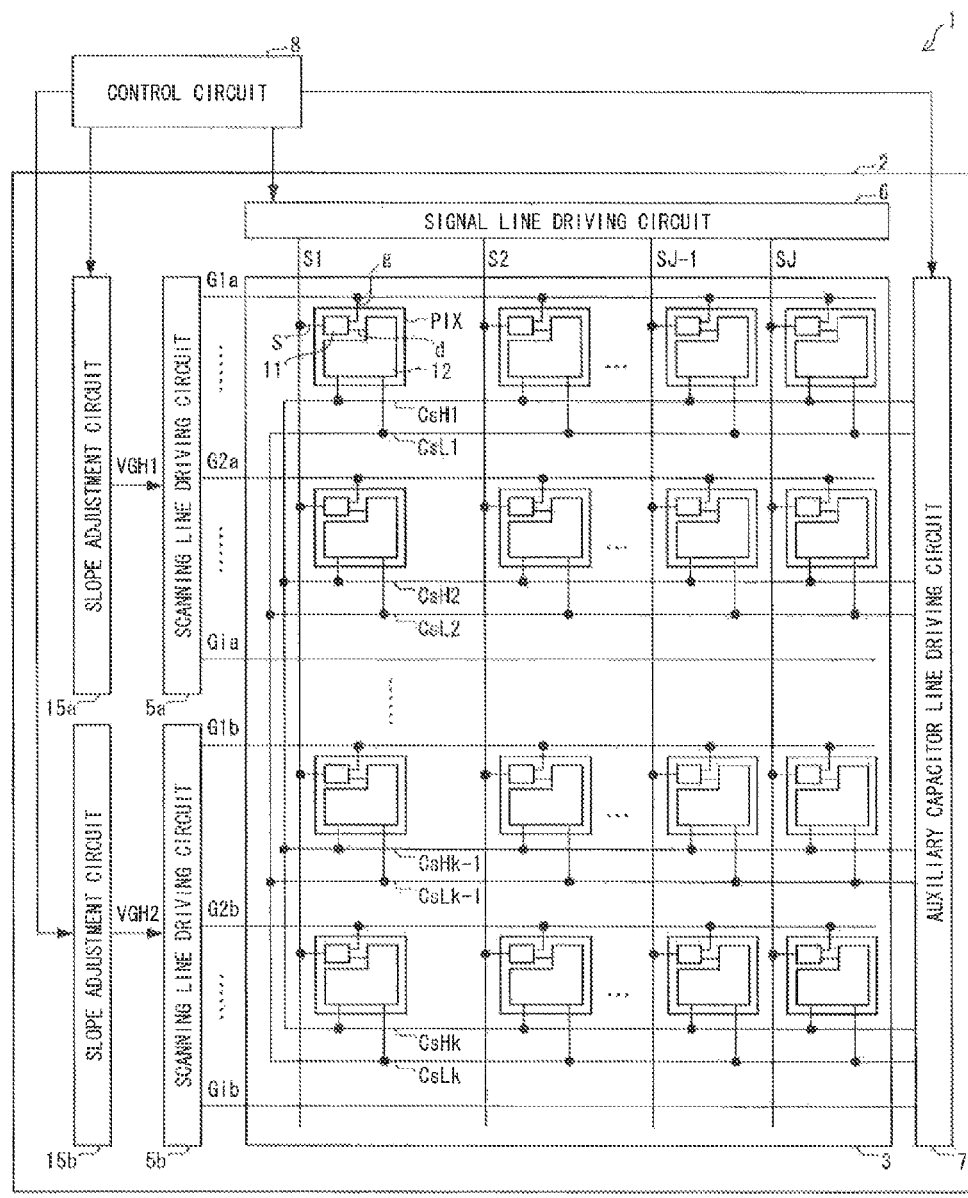
FIG. 1 is a diagram showing a configuration of a liquid crystal display device of the present invention.

FIG. 1 shows a configuration of a liquid crystal display device 1 according to the present embodiment.

The liquid crystal display device 1 includes: a liquid crystal display panel 2; and a control circuit 8, which outputs signals to each circuit formed in the liquid crystal panel 2 and which controls driving of pixels of the liquid crystal display panel 2.

The liquid crystal display panel 2 includes a display region 3, scanning line (gate line) driving circuits (scanning line driving sections) 5a and 5b, a signal line (source line) driving circuit 6, and an auxiliary capacitor line driving circuit 7.

The liquid crystal display panel 2 is a display panel including: an active-matrix substrate on which the display region 3, a plurality of scanning lines (gate bus lines) G1a, G1b, G2a, G2b, ..., Gia, and Gib (where i is a natural number of 1 to I), a plurality of signal lines (source bus lines) S1, S2, ..., and Sj (j is an natural number of 1 to J), auxiliary capacitor lines (Cs bus lines) CsH1, CsL1, CsH2, CsL2, ..., CsHk, and CsLk (k is a natural number of 1 to K), the scanning line driving circuits 5a and 5b, the signal line driving circuit 6, and the auxiliary capacitor line driving circuit 7 have been fabricated; a liquid crystal layer; and a counter substrate placed opposite the active-matrix substrate with the liquid crystal layer sandwiched therebetween.

The display region 3 is a region having a plurality of pixels PIX arranged in rows and columns. Each of the pixels PIX includes: a TFT element 11, which is a selection element of the pixel PIX; a liquid crystal capacitor; and an auxiliary capacitor 12.

It should be noted here that in the present embodiment, those ones of the scanning lines G1a, G1b, G2a, G2b, ..., Gia, and Gib each of which is connected its corresponding ones of the pixels disposed in the upper half of the drawing are referred to as "group of scanning lines Gia", and those ones of the scanning lines G1a, G1b, G2a, G2b, ..., Gia, and Gib each of which is connected its corresponding ones of the pixels disposed in the lower half of the drawing are referred to as "group of scanning lines Gib".

Assuming that the direction along which the signal lines Sj extend is a vertical direction, the group of scanning lines Gia and the group of scanning lines Gib are arranged in the order of increasing distance from the signal line driving circuit 6 along the vertical direction.

The TFT element 11 has its gate electrode g connected to the group of scanning lines Gia or the group of scanning lines Gib, and has its source electrode s connected to a signal line Sj. The TFT element 11 has its drain electrode d connected to the liquid crystal capacitor and the auxiliary capacitor 12, which is connected to an auxiliary capacitor line CsHk and an auxiliary capacitor line CsLk.

The counter substrate has counter electrodes placed thereon in such a way as to face each separate auxiliary capacitor 12 with the liquid crystal layer sandwiched therebetween.

The scanning line driving circuits 5a and 5b, the signal line driving circuit 6, and the auxiliary capacitor line driving circuit 7 are controlled in accordance with signals that are outputted from the control circuit 8.

The signal line driving circuit 6 is provided in a region adjacent to one side of the display region 3 along the direction along which the signal lines Sj extend. The liquid crystal display panel 2 is provided with a single signal line driving circuit, namely the signal line driving circuit 6, with the signal lines Sj connected to the signal line driving circuit 6. The signal line driving circuit 6 supplies data signals to the signal lines Sj in accordance with a control signal from the control circuit 8.

Each of the signal lines Sj is not divided halfway through, and is connected in such a way as to extend to the pixel PIX placed in the farthest location from the signal line driving circuit 6. Thus, in the liquid crystal display device 1, the single signal line driving circuit 6 formed in the liquid crystal display panel 2 controls driving of the pixel PIX formed in the farthest location from the signal line driving circuit 6.

The auxiliary capacitor line driving circuit 7 is provided in a region adjacent to one side of the display region 3 along the direction along which the auxiliary capacitor lines CsHk and CsLk extend. The liquid crystal display panel 2 is provided with a single auxiliary capacitor line driving circuit 7, namely the auxiliary capacitor line driving circuit 7, which is placed opposite the scanning line driving circuits 5a and 5b with the display region 3 interposed therebetween, with the auxiliary capacitor lines CsHk and CsLk connected to the auxiliary capacitor line driving circuit 7. The auxiliary capacitor line driving circuit 7 supplies auxiliary capacitor driving signals to the auxiliary capacitor lines CsHk and CsLk in accordance with a control signal from the control circuit 8.

The auxiliary capacitor lines CsHk are wires through which high-voltage signals are supplied to the auxiliary capacitors 12. The auxiliary capacitor lines CsLk are wires through which low-voltage signals are supplied to the auxiliary capacitors 12.

Each of the auxiliary capacitor lines CsHk and CsLk is not divided halfway through, and is connected in such a way as to extend to the pixel PIX placed in the farthest location from the auxiliary capacitor line driving circuit 7. Thus, in the liquid crystal display device 1, the single auxiliary capacitor line driving circuit 7 formed in the liquid crystal display panel 2 controls driving of the pixel PIX formed in the farthest location from the auxiliary capacitor line driving circuit 7.

It should be noted that the liquid crystal display panel 2, in which the single signal line driving circuit 6 and the single auxiliary capacitor line driving circuit 7 controls driving of all the pixels PIX formed in the display region 3, is sometimes referred to as "liquid crystal display panel not based on divisional driving".

The scanning line driving circuits 5a and 5b serve to generate gate signals (scanning signals). In the liquid crystal display device 1, the liquid crystal display panel 2 is provided with a total of two scanning line driving circuits, namely the scanning line driving circuit 5a and scanning line driving circuit 5b, which are placed opposite the auxiliary capacitor line driving circuit 7 with the display region 3 interposed therebetween.

The scanning line driving circuit 5a is provided in a region adjacent to one side of the display region 3 along the direction along which the group of scanning lines Gia extend. The scanning line driving circuit 5b is provided in a region adjacent to one side of the display region 3 along the direction along which the group of scanning lines Gib extend.

The scanning line driving circuits 5a and 5b, placed in such a way as to be able to drive the pixels PIX with the pixels PIX divided into a plurality of groups, are disposed for the groups of scanning lines Gia and Gib, respectively. The group of scanning lines Gia are connected to the scanning line driving circuit 5a, and the group of scanning lines Gib are connected to the scanning line driving circuit 5b.

The scanning line driving circuit 5a serves to control driving of upper-half ones of the pixels PIX formed in the display region 3. The scanning line driving circuit 5b serves to control driving of lower-half ones of the pixels PIX formed in the display region 3.

The groups of scanning lines Gia and Gib are not divided halfway through, and are connected in such a way as to extend to the pixels PIX placed in the farthest locations from the scanning line driving circuits 5a and 5b. Thus, in the liquid crystal display device 1, the scanning line driving circuits 5a and 5b formed in the liquid crystal display panel 2 control the gate electrodes d of the pixels PIX formed in the farthest locations from the scanning line driving circuits 5a and 5b.

The scanning line driving circuit 5a supplies a gate signal to each scanning line in the group of scanning lines Gia in accordance with a control signal from the control circuit 8. That is, the scanning line driving circuit 5a outputs gate signals via the group of scanning lines Gia to the upper-half ones of the pixels PIX formed in the display region 3.

The scanning line driving circuit 5b supplies a gate signal to each scanning line in the group of scanning lines Gib in accordance with a control signal from the control circuit 8. That is, the scanning line driving circuit 5b outputs gate signals via the group of scanning lines Gib to the lower-half ones of the pixels PIX formed in the display region 3.

It should be noted here that the scanning line driving circuits 5a and 5b output gate signals composed of pulse waves having inclined falling edges (slopes) to the groups of scanning lines Gia and Gib, respectively.

Of the pulse waveforms of gate signals or high-potential signals (scanning signal generating signals) VGH1 and VGH2 in accordance with which gate signals are generated, a pulse waveform whose falling edge slopes are inclined, i.e. whose falling edge potentials decrease by linearly sloping is referred to as a gate slope (sloping part of a falling edge). Further, a waveform having a gate slope is referred to as "gate slope waveform".

The scanning line driving circuits 5a and 5b acquire high potentials (scanning signal generating signals) VGH1 from the slope adjustment circuits 15a and 15b, respectively, and generate gate signals from the high-potential signals VGH1 thus acquired. Then, the scanning line driving circuits 5a and 5b output the gate signals thus generated to the groups of scanning lines Gia and Gib connected to the scanning line driving circuits 5a and 5b, respectively.

The high-potential signals VGH1 and VGH2 that the scanning line driving circuits 5a and 5b acquire from the slope adjustment circuits 15a and 15b take gate slope waveforms. Since the scanning line driving circuits 5a and 5b generate gate signals from the high-potential signals VGH1 and VGH2, the gate signals thus generated take gate slope waveforms.

The slope adjustment circuits (potential control circuits) 15a and 15b are placed in front of the scanning line driving circuits 5a and 5b, respectively. That is, the slope adjustment circuit 15a is placed between the control circuit 8 and the scanning line driving circuit 5a, and the slope adjustment circuit 15b is placed between the control circuit 8 and the scanning line driving circuit 5b.

The slope adjustment circuits (potential control circuits) 15a and 15b acquire high potentials (scanning signal generating signals) VGH, composed of pulse waves, in accordance with which gate signals are generated, and incline falling edges of the acquired high potentials (scanning signal generating signals) VGH1 and VGH2 for the groups of scanning lines Gia and Gib, respectively. Then, the slope adjustment circuits 15a and 15b output, to the subsequent scanning line driving circuits 5a and 5b, the high potentials VGH1 and VGH2 inclined for the groups of scanning lines Gia and Gib, respectively.

The slope adjustment circuits 15a and 15b are configured such that the voltage waveform of either of the slope adjustment circuits 15a and 15b can be adjusted with reference to the voltage waveform of the other one of the slope adjustment circuits 15a and 15b. That is, the slope adjustment circuits 15a and 15b are configured such that the waveform of a voltage that is outputted from the slope adjustment circuit 15b can be adjusted with reference to the waveform of a voltage that is outputted from the slope adjustment circuit 15a (scanning line driving circuit 5a) or that the waveform of a voltage that is outputted from the slope adjustment circuit 15a can be adjusted with reference to the waveform of a voltage that is outputted from the slope adjustment circuit 15a (scanning line driving circuit 5b). The slope adjustment circuits 15a and 15b will be described in detail below.

Thus, in the liquid crystal display device 1, the scanning line driving circuits 5a and 5b are disposed for the groups of scanning lines Gia and Gib, respectively. This makes it possible to reduce the number of scanning lines that are driven by a single scanning line driving circuit 5a or 5b, thus making it possible to prevent distortion of a falling edge of a gate signal that is outputted to a scanning line.

Further, in the liquid crystal display device 1, the slope adjustment circuits 15a and 15b, which incline falling edges of high potentials VGH1 and VGH2, composed of pulse waves, in accordance with which gate signals (scanning signals) are generated, are placed in front of the scanning line driving circuits 5a and 5b, respectively. This allows the scanning line driving circuits 5a and 5b to acquire the high-potential signals VGH1 and VGH2 composed of pulse waves whose falling edges have been inclined by the slope adjustment circuits 15a and 15b, i.e., composed of gate slope waveforms.

Then, the scanning line driving circuits 5a and 5b generate gate signals from the high-potential signals VGH1 and VGH2 thus acquired. For this reason, the shapes of pulse waves of the gate signals generated by the scanning line driving circuits 5a and 5b are also shapes having inclined falling edges, i.e., gate slope waveforms.

Thus, the gate signals generated by the scanning line driving circuits 5a and 5b have gate slope waveforms whose falling edges are inclined, and as such, can make it harder for the falling edges to be distorted.

Further, the slope adjustment circuits 15a and 15b incline the falling edges of the high-potential signals VGH1 and VGH2 for the groups of scanning lines Gia and Gib, respectively. For this reason, the slopes of the falling edges of the high-potential signals VGH1 and VGH2 can be optimized in accordance with parasitic capacitors and the like that are formed in each of the plurality of groups of scanning lines Gia and Gib. This makes it possible to prevent a sloping part of a falling edge of a gate signal that is outputted to each scanning line from varying between the groups of scanning lines Gia and Gib.

Thus, in the liquid crystal display device 1, variations in gradation with an in-plane distribution are reduced by preparing the plurality of scanning line driving circuits 5a and 5b and the plurality of slope adjustment circuits 15a and 15b, dividing the plane of the liquid crystal display panel 2 into several regions, and adjusting each gate slope waveform.

Alternatively, variations in gradation (i.e., luminance unevenness) can also be reduced by adjusting a gate slope waveform by adjusting another gate slope waveform with reference to the voltage waveform of any one of the plurality of regions.

Therefore, the liquid crystal display device 1 makes it possible to prevent the occurrence of luminance unevenness in each display region by adjusting sloping parts of falling edges of gate signals for each of the groups of scanning lines Gia and Gib.

Further, the plurality of slope adjustment circuits 15a and 15b incline falling edges of the high-potential signals VGH1 and VGH2 and output, to the scanning line driving circuits 5a and 5b, the high-potential signals whose falling edges have been inclined, respectively. This allows the scanning line driving circuits 5a and 5b to incline falling edges of gate signals for each of the groups of scanning lines Gia and Gib. This makes it possible to equalize sloping parts of falling edges of gate signals that are outputted to each separate scanning line.

Thus, according to the liquid crystal display device 1, the ON time of a gate signal can be changed by causing the gate signal to take a gate slope waveform with inclined falling edges.

Figure 9:
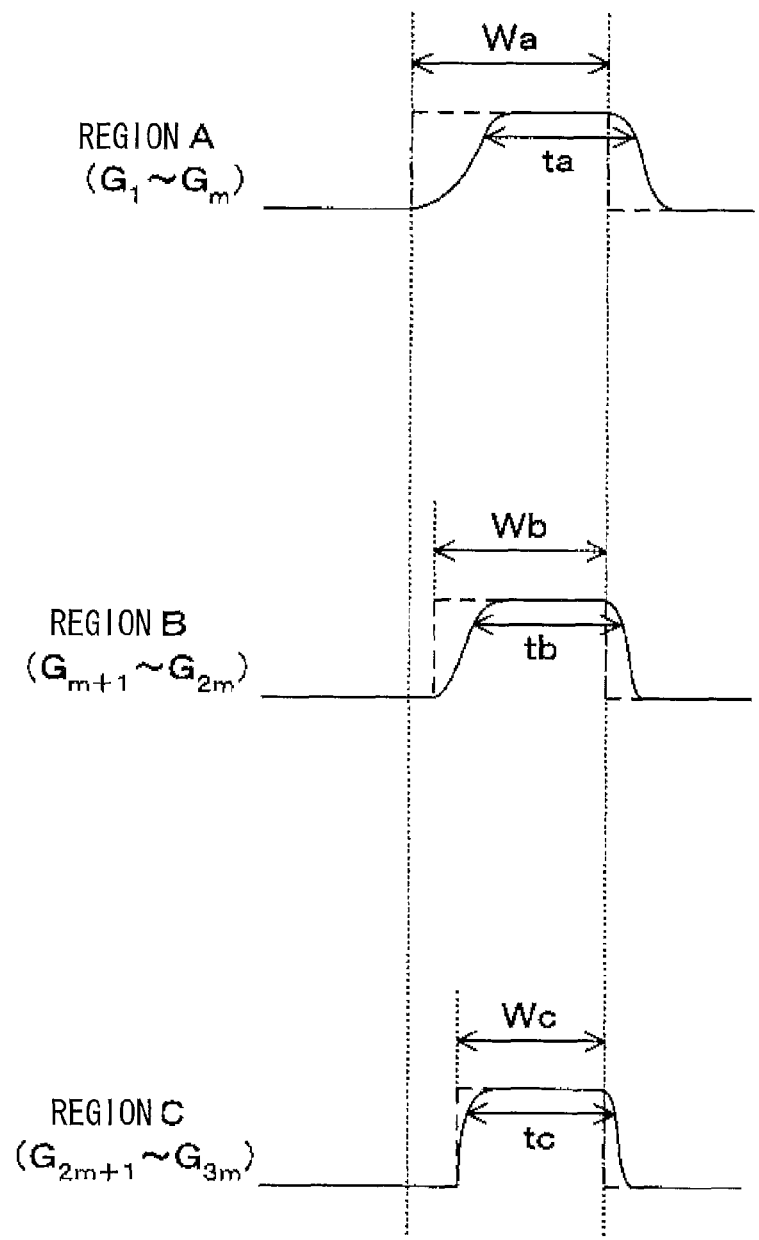
FIG. 9 is a diagram showing examples of waveforms of the scanning signals that are applied to each separate pixel of the conventional display panel.
Figure 10:
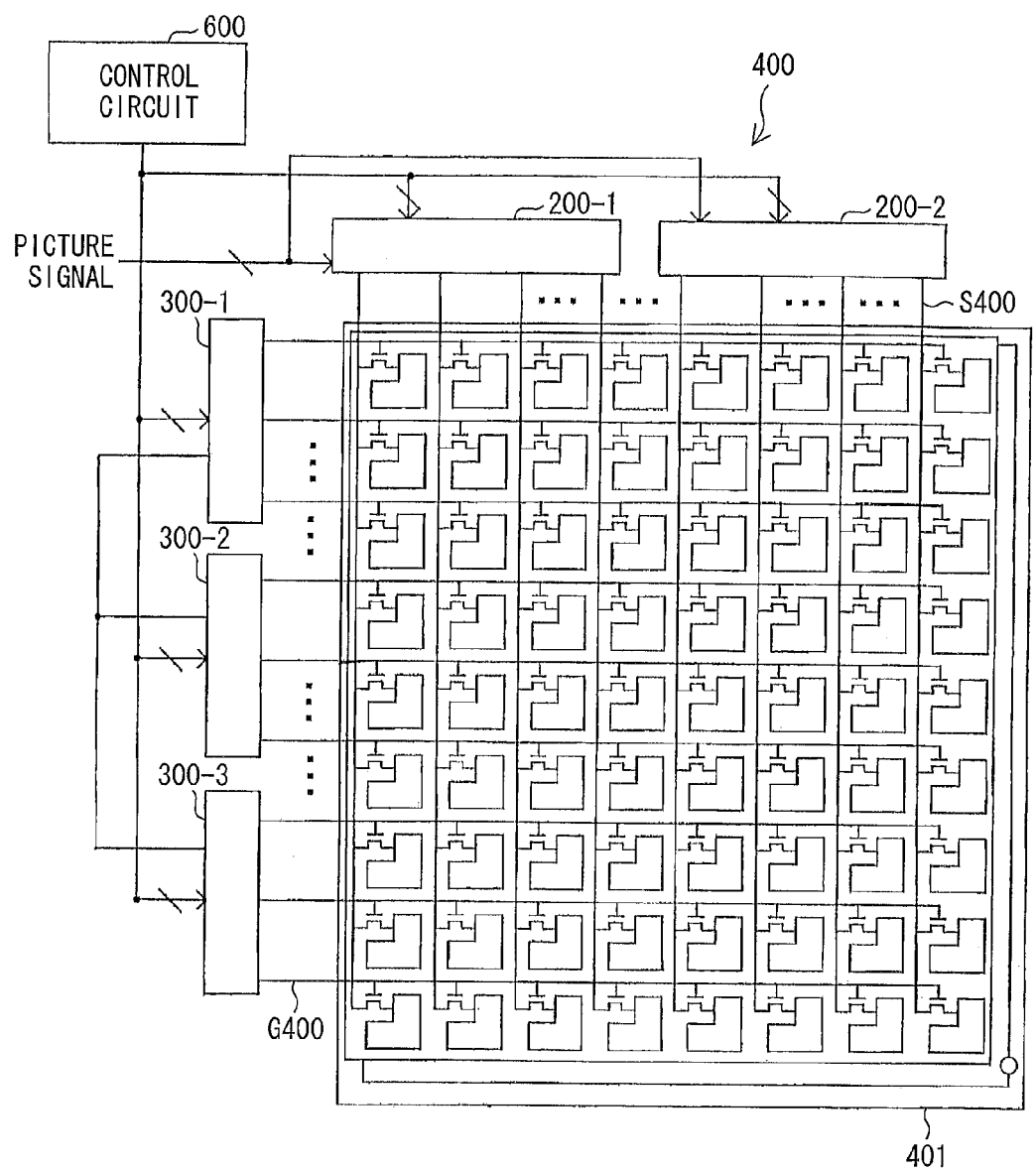
FIG. 10 is a diagram showing a configuration of a conventional liquid crystal display device.
Figure 11:
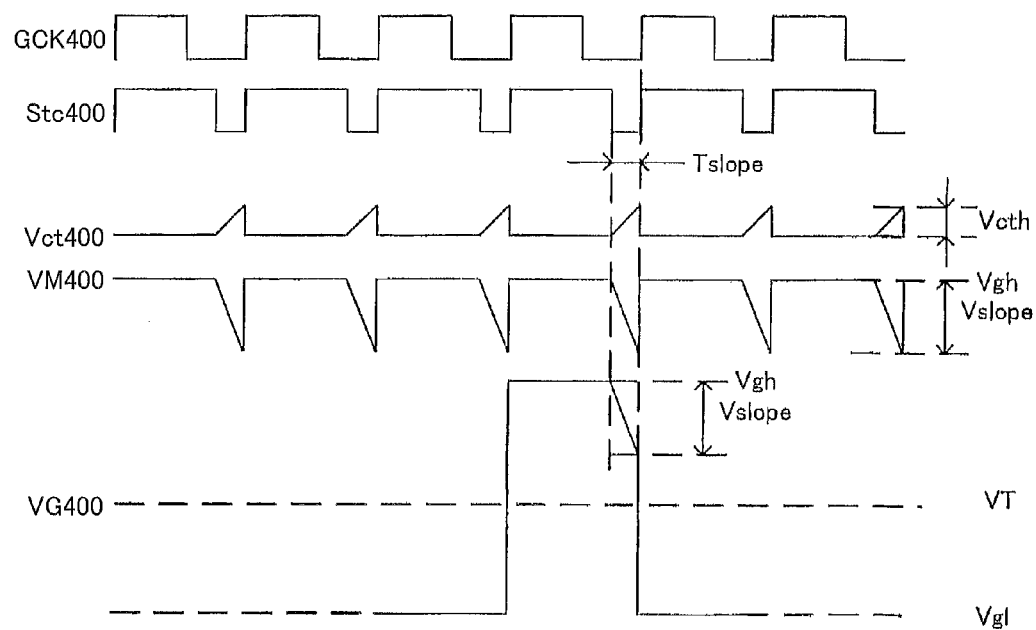
FIG. 11 is a diagram showing the waveforms of signals that are outputted from picture signal line driving circuits, scanning signal line driving circuits, and a control circuit of the conventional liquid crystal display device.
Figure 12:
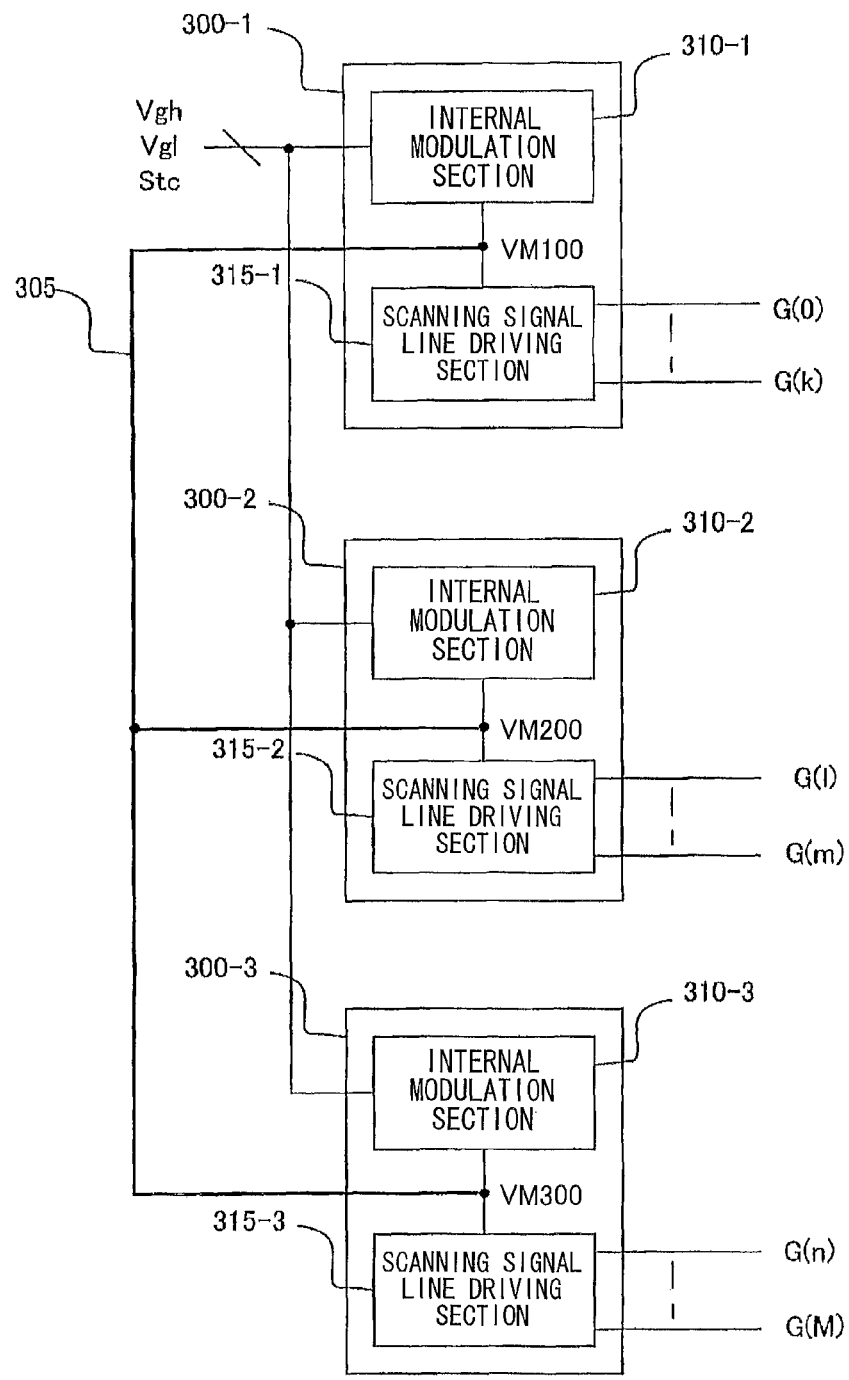
FIG. 12 is a diagram showing a configuration of the scanning signal line driving circuits of the conventional liquid crystal display device.

In Patent Literature 1, as shown in FIG. 9, the ON time of a scanning signal G is changed by adjusting the width of the scanning signal G. For this reason, in Patent Literature 1, waveforms of scanning signals G vary among the regions A, B, and C. Therefore, in Patent Literature 1, an in-plane distribution occurs in counter voltage set at an optimum voltage, so that flickers tend to take place.

On the other hand, the liquid crystal display device 1, as mentioned above, makes it possible to adjust falling edges of gate signals for each of the groups of scanning lines Gia and Gib, and therefore makes it possible to prevent variations in the waveforms of the gate signals. For this reason, the liquid crystal display device 1 makes it possible to prevent the occurrence of an in-plane distribution in counter voltage set at an optimum voltage, and therefore makes it possible to prevent the occurrence of flickers.

Thus, in comparison with such a case as in Patent Literature 1 where the widths of the scanning signals G vary from one display region to another, the liquid crystal display device can improve display quality because it can equalize the waveforms of the gate signals for each display region.

(Slope Adjustment Circuits for Adjusting the Slopes of Gate Waveforms)

Next, a circuit configuration of the slope adjustment circuits (potential control circuits) 15a and 15b provided in front on the scanning line driving circuits 5a and 5b, respectively, is described with reference to FIG. 2.

Figure 2:
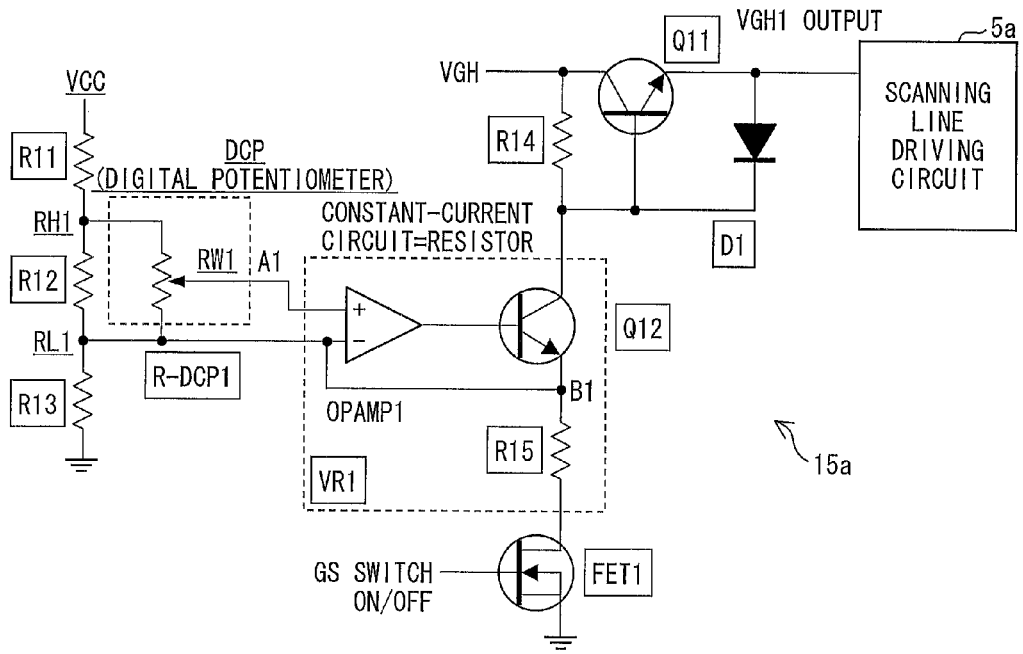
FIG. 2 is a circuit diagram showing a configuration of slope adjustment circuits of the liquid crystal display device of the present invention.
Figure 2:
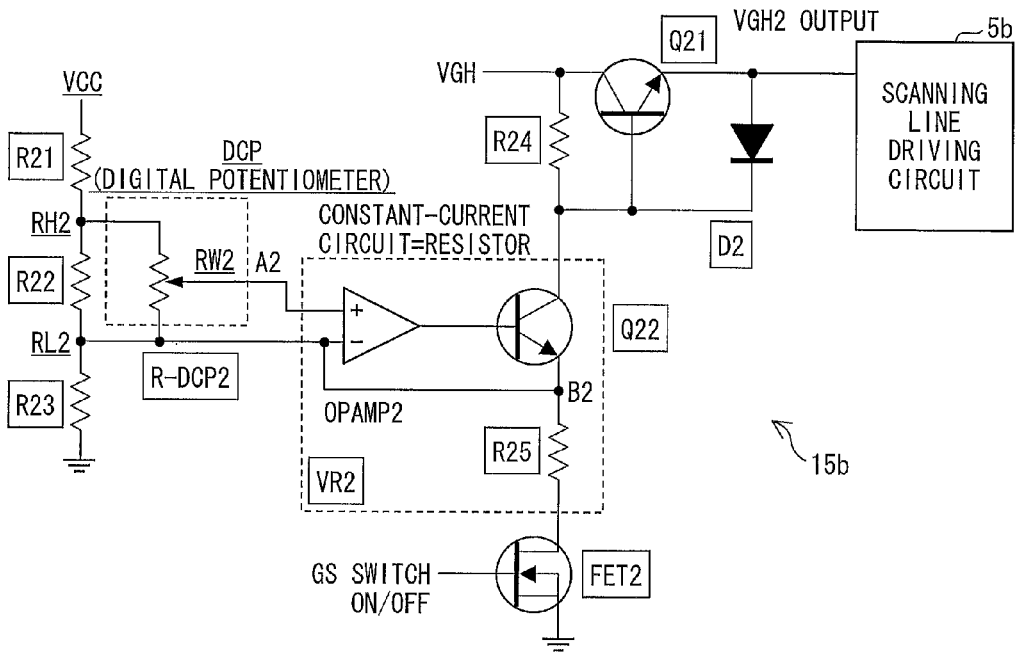

FIG. 2 is a circuit diagram showing a configuration of the slope adjustment circuits 15a and 15b.

Since the slope adjustment circuits 15a and 15b are identical in circuit configuration to each other, the corresponding members are collectively described.

The slope adjustment circuit 15a includes: a plurality of resistors, a digital potentiometer (variable resistor) R-DCP1, which is a DCP (digital potentiometer) that is a variable resistor; a constant-current circuit VR1, which functions as a resistor; a transistor (switch) FET1, which is a field-effect transistor; an NPN transistor Q11; and a diode D1. The slope adjustment circuit 15b includes: a plurality of resistors, a digital potentiometer (variable resistor) R-DCP2, which is a DCP (digital potentiometer) that is a variable resistor; a constant-current circuit VR2, which functions as a resistor; a transistor (switch) FET2, which is a field-effect transistor; an NPN transistor Q12; and a diode D2.

The constant-current circuits VR1 and VR2 include operational amplifiers OP1 and OP2, which are operational amplifiers, NPN transistors Q12 and Q22, and resistors R15 and R25, respectively.

The slope adjustment circuit 15a has three transistors connected in series, namely resistors R11, R12, and R13, and the slope adjustment circuit 15b has three transistors connected in series, namely resistors R21, R22, and R23. Each of the resistors R11 and R21 has one terminal connected to the control circuit 8 so that a power supply voltage Vcc is applied to the one terminal. The resistors R13 has one terminal connected to the resistor R12, with the other terminal being grounded. The resistors R23 has one terminal connected to the resistor R22, with the other terminal being grounded. It should be noted that the resistor R12 may be a resistor whose value of resistance is fixed or, as will be described later, may be a variable resistor whose value of resistance is able to be changed.

The digital potentiometers (variable resistors) R-DCP1 and R-DCP2 serve to adjust the ON resistances of the transistors Q12 and Q22, respectively. The ON resistances of the transistors Q12 and Q22 serve as values of gate slope resistance. The digital potentiometers R-DCP1 and R-DCP2 make it possible to determine the angles of inclination of falling edges of the high-potential signals VGH1 and VGH2 (i.e., the degrees of inclination of falling edges of the high-potential signals VGH1 and VGH2), respectively.

The angles of inclination of falling edges of the high-potential signals VGH1 and VGH2 can be determined by changing the values of resistance of the digital potentiometers R-DCP1 and R-DCP2, respectively. This makes it possible to easily equalize the inclination of falling edges of gate signals that are outputted to each separate scanning line.

The digital potentiometers R-DCP1 and R-DCP2 include resistors and steps RW1 and RW2 for adjusting the values of resistance of the resistors, respectively. The digital potentiometers R-DCP1 and R-DCP2 are semifixed resistors such as electronic variable resistors.

As in the case of the digital potentiometers R-DCP1 and R-DCP2, the resistors that are provided for determining the angles of inclination of falling edges of the high-potential signals VGH1 and VGH2 need only be variable resistors and are not limited to digital potentiometers. For example, the resistors may not be digital variable resistors but analog variable resistors.

The digital potentiometers R-DCP1 and R-DCP2 have their internal resistors connected in parallel with the resistors R12 and R22, respectively. The steps RW1 and RW2, which serve to change the resistances of the digital potentiometers R-DCP1 and R-DCP2, are connected to noninverting (+) input terminals of operational amplifiers OP1 and OP2 constituting the constant-current circuits VR1 and VR2, respectively.

The steps RW1 and RW2 are connected to the noninverting input terminals of the operational amplifiers OP1 and OP2 via wires A1 and A2 to which voltages VA1 and VA2 are applied, respectively.

The ranges of adjustment of the voltages VA1 and VA2 are determined by the values of resistance of the resistors R11 and R21, the resistors R12 and R22, the resistors R13 and R23, and the digital potentiometers R-DCP1 and R-DCP2, respectively. Normally, the values of resistance of the resistors R-DCP1 and R-DCP2 are set to take on sufficiently greater values than the values of resistance of the resistors R11 and R21, the resistors R12 and R22, and the resistors R13 and R23.

The variable resistor serving as the digital potentiometer R-DCP1 has one terminal connected to the other terminal of the resistor R11 and one terminal of the resistor R12, and the variable resistor serving as the digital potentiometer R-DCP2 has one terminal connected to the other terminal of the resistor R21 and one terminal of the resistor R22. A voltage RH1 is a voltage at a point of contact between the other terminal of the resistor R11 and the one terminal of the resistor R12, and a voltage RH2 is a voltage at a point of contact between the other terminal of the resistor R21 and the one terminal of the resistor R22.

The variable resistor serving as the digital potentiometer R-DCP1 has the other terminal connected to a wire via which the other terminal of the resistor R12 and one terminal of the resistor R13 are connected to an noninverting (−) input terminal of the operational amplifier OP1, and the variable resistor serving as the digital potentiometer R-DCP2 has the other terminal connected to a wire via which the other terminal of the resistor R22 and one terminal of the resistor R23 are connected to an noninverting (−) input terminal of the operational amplifier OP2. A voltage RL1 is a voltage at a point of contact between the other terminal of the resistor R12 and the one terminal of the resistor R13, and a voltage RL2 is a voltage at a point of contact between the other terminal of the resistor R22 and the one terminal of the resistor R23.

The values of the voltages VA1 and VA2 can be controlled between the voltages RH1 and RH2 and the voltages RL1 and RL2 by controlling the steps RW1 and RW2 of the variable resistors serving as the digital potentiometers R-DCP1 and R-DCP2, respectively.

The constant-current circuits VR1 and VR2 serve to reduce the potential of a high-potential signal VGH. The constant-current circuits VR1 and VR2 function as resistors for pulling out the high-potential signal VGH being applied to the scanning line driving circuits 5a and 5b, thereby inclining the falling edges of the high-potential signals VGH1 and VGH2, respectively.

The high-potential signal VGH is a high-potential-side signal in accordance with which gate signals are generated, and takes a pulse waveform. Upon receiving the high-potential signal VGH, the slope adjustment circuits 15a and 15b generate the high-potential signals VGH1 and VGH2, which take gate slope waveforms, from the pulse waveform of the high-potential signal VGH, and then output them to the scanning line driving circuits 5a and 5b, respectively.

In the constant-current circuits VR1 and VR2, the operational amplifiers OP1 and OP2 and the transistors Q12 and Q22 are connected in series by connecting output terminals of the operational amplifiers OP1 and OP2 to base terminals of the transistors Q12 and Q22, respectively.

The transistor Q12 has its emitter connected to one terminal of a resistor R15 and connected to a wire via which an inverting input terminal of the operational amplifier OP1 is connected to the other terminal of the resistor R12 and the one terminal of the resistor R13, and the transistor Q22 has its emitter connected to one terminal of a resistor R25 and connected to a wire via which an inverting input terminal of the operational amplifier OP2 is connected to the other terminal of the resistor R22 and the one terminal of the resistor R23. The transistor Q12 has its emitter connected to the one terminal of the resistors R15 via a wire B1 to which a voltage VB1 is applied, and the transistor Q22 has its emitter connected to the one terminal of the resistors R25 via a wire B2 to which a voltage VB2 is applied.

The transistors FET1 and FET2 are n-channel field-effect transistors. The transistors FET1 and FET2 function as switches to switch between an ON state (operating state) and an OFF state (nonoperating state) of the constant-current circuits VR1 and VR2, respectively. Whether or not to reduce the potential of the high-potential signal VGH can be selected by switching between the ON state and the OFF state of the transistors FET1 and FET2. This makes it possible to control the potentials of the high-potential signals VGH1 and VGH2.

In the following description, the transistors FET1 and FET2 are sometimes referred to as "GS switches".

The transistor FET1 has its gate terminal connected to the control circuit 8, its source terminal grounded, and its drain terminal connected to the other terminal of the resistor R15, and the transistor FET2 has its gate terminal connected to the control circuit 8, its source terminal grounded, and its drain terminal connected to the other terminal of the resistor R25.

A resistor R14, the transistor Q11, and a diode D1 are connected in parallel to one another, and a resistor R24, the transistor Q21, and a diode D2 are connected in parallel to one another.

The resistor R14 has one terminal connected to the control circuit 8 and connected to a collector terminal of the transistor Q11, and the resistor R24 has one terminal connected to the control circuit 8 and connected to a collector terminal of the transistor Q21. The high-potential signal VGH is applied from the control circuit 8 to the one terminal of the resistor R14 and the one terminal of the resistor R24.

The resistor R14 has its other terminal connected to the base terminal of the transistor Q11 and the cathode of the diode D1 and also connected to the collector terminal of the transistor Q12, and the resistor R24 has its other terminal connected to the base terminal of the transistor Q21 and the cathode of the diode D2 and also connected to the collector terminal of the transistor Q22.

The transistors Q11 and Q12 have their emitter terminals connected to the anodes of the diodes D1 and D2 and connected to the scanning line driving circuits 5a and 5b, respectively.

The slope adjustment circuits 15a and 15b thus configured receive a scanning line high potential VGH from the control circuit 8, generate gate slope waveforms from the scanning line high potential VGH, and sends the gate slope waveforms thus generated to the scanning line driving circuits 5a and 5b, respectively.

(Description of Operation of the Slope Adjustment Circuits)

Next, the operation of the slope adjustment circuits 15a and 15b is described with reference to FIGS. 2 and 3.

Figure 3:
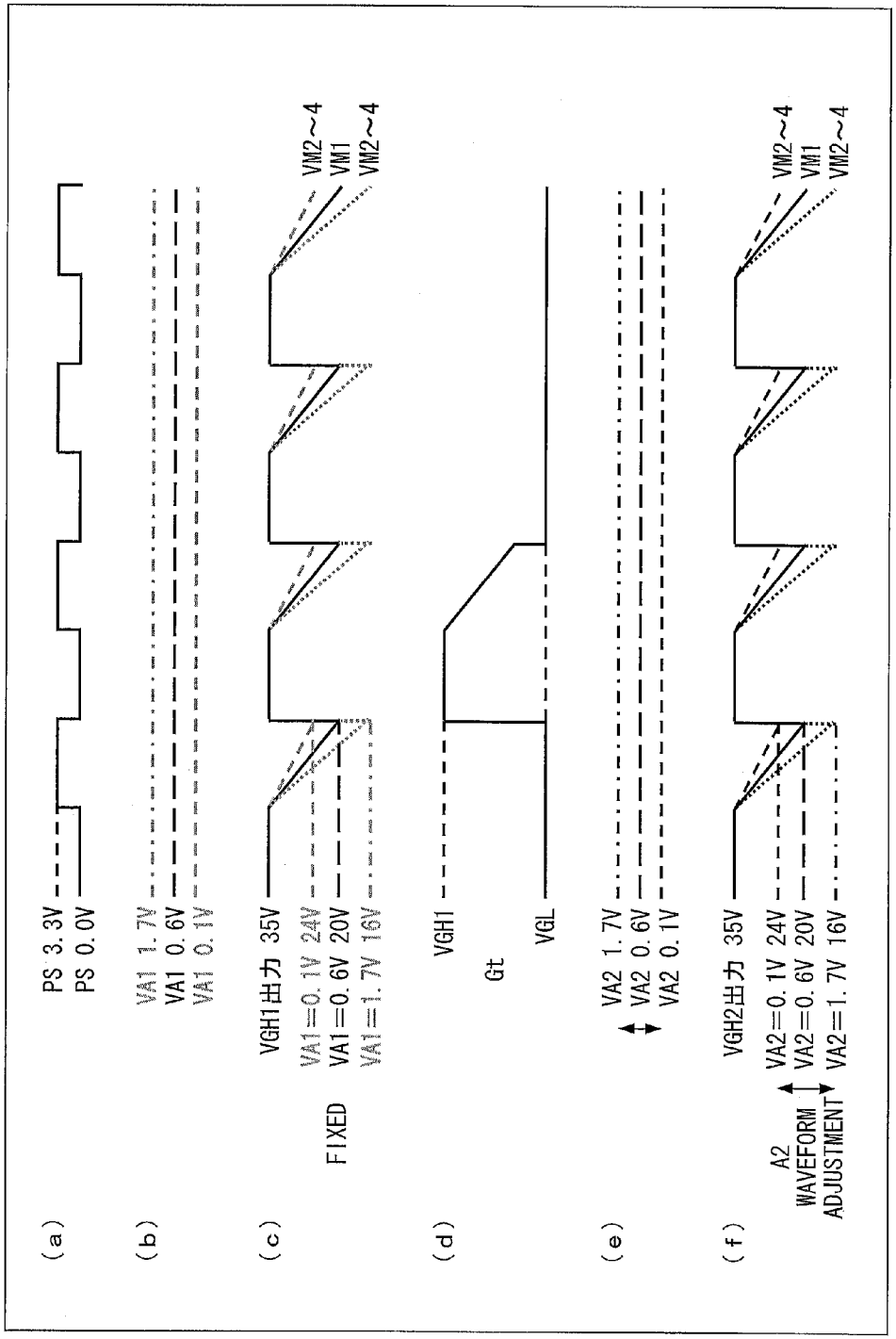
FIG. 3 is a diagram showing signals that are inputted to and outputted from the slope adjustment circuits and scanning line driving circuits of the liquid crystal display device of the present invention.

FIG. 3 is a diagram showing signals that are inputted to and outputted from the slope adjustment circuits 15a and 15b and the scanning line driving circuits 5a and 5b.

First, the operation of the slope adjustment circuit 15a is described. Since the slope adjustment circuit 15b operates in a similar manner, the operation of the slope adjustment circuit 15b alone is not described.

Either a gate slope waveform outputted from the slope adjustment circuit 15a or a gate slope waveform outputted from the slope adjustment circuit 15b may be adjusted. A case is described here where a gate slope outputted from the slope adjustment circuit 15a is fixed and a gate slope outputted from the slope adjustment circuit 15b is adjusted.

(a) of FIG. 3 shows a pulse signal Ps that is inputted to the transistor FET1.

First, as shown in (a) of FIG. 3, the transistor FET1, which is a Gs switch, receives via its gate terminal the pulse signal Ps matched with the horizontal synchronizing signal from the control circuit 8. It is assumed that the amplitude of the pulse signal Ps received by the transistor FET1 has its L (low) level at GND and its H (high) level at a sufficient voltage to turn on (drive) the transistor FET1.

It is assumed in the present embodiment that the voltage of the pulse signal Ps at the H level is 3.3 V and the voltage of the pulse signal Ps at the L level is 0.0 V.

While the transistor FET1 is receiving the pulse signal Ps at the L level via its gate terminal, the transistor FET1 functions as a switch OFF, and the constant-current circuit VR1 is also in a nonoperating state. With this, the high-potential signal VGH applied to one terminal of the resistor R14 is passed through the transistor Q11 from the collector terminal to the emitter terminal without change to be supplied to the scanning line driving circuit 5a as the high-potential signal VGH1.

When the transistor FET1 receives the pulse signal Ps at the H level via its gate terminal, the transistor FET1 gets its drain and source terminals placed in a conducting state. That is, the transistor FE1 functions as a switch ON, and the constant-current circuit VR1 is also in an operating state. The constant-current circuit VR1, which is now in an operating state, causes the charge of the high-potential signal VGH being supplied to the scanning line driving circuit 5a to be pulled out though the diode D1, the transistor Q12, and the resistor R15.

The value of a combination of the value of ON resistance of the transistor Q12 and the value of resistance of the resistor R15 is here referred to as "value of gate slope resistance". By adjusting the value of gate slope resistance, the inclination of a gate slope of the high-potential signal VGH1 can be adjusted.

Next, the operation of the constant-current circuit VR1 is described. When the step RW1 of the digital potentiometer R-DCP1 is fixed at such a position as to take on the value of intermediate resistance of the variable resistor, the voltage VA1 of the wire A1 becomes fixed. The range of the voltage VA1 is determined by the resistors R11, R12, and R13 and the digital potentiometer R-DCP1.

(b) of FIG. 3 shows the waveform of the voltage VA1 of the wire A1.

As shown in (b) of FIG. 3, it is assumed in the present embodiment that the voltage VA1 can be set at a value in the range of 0.1 V to 1.7 V by adjusting the value of resistance of the digital potentiometer R-DCP1 and is fixed at 0.6 V. The voltage VA1 is determined by thus changing the step RW1 of the digital potentiometer R-DCP1.

It should be noted that although the present embodiment uses the digital potentiometer R-DCP1, the digital potentiometer R-DCP1 may be omitted and the resistor R12 may be constituted by a resistor composed of a mechanical semifixed volume. That is, the present embodiment may be configured such that the digital potentiometer R-DCP1 may be omitted and the value of resistance of the resistor R12 is adjustable.

When the drain and source terminals of the transistor FET1 become conductive with the voltage VA1 of the wire A1 fixed, the ON resistance of the transistor Q12 changes. This causes the voltage of the resistor R15 to move so that the voltage VA1 equals the voltage VB1. That is, the voltage VA2 is at 0.6 V, as with the voltage VA1.

When the voltage VB1 of the wire B1 takes on a steady value by the voltage VB1 becoming equal to the voltage VA1, the ON resistance of the transistor Q12 is held at a steady value.

Thus, since the operational amplifier OP1, the transistor Q12, and the resistor R15 operate as the constant-current circuit VR1 and the ON resistor of the transistor Q12 operates as a fixed resistor, the inclination of a gate slope of the high-potential signal VGH can be adjusted.

(c) of FIG. 3 shows the high-potential signal VGH1 outputted from the slope adjustment circuit 15a.

As shown in (c) of FIG. 3, the voltage of the high-potential signal VGH1 when the power is turned on is 35 V. Input of the pulse signal Ps at the H level to FET1 causes the high-potential signal VGH1 to start falling and linearly decrease in potential. Then, input of the pulse signal Ps at the L level to FET1 causes the high-potential signal VGH1 to finish falling and rise in potential from 20 V to 35 V.

Thus, a pulse signal Ps (rectangular wave) at sufficient voltages to turn ON/OFF the transistor FET1, e.g., voltages of 0V (OFF) and 3.3 V (ON), is inputted to the transistor FET1, which is a GS switch, via its gate terminal. When the transistor FET1 is ON, the charge of the high-potential signal VGH is pulled out through a path constituted by the diode D1, the transistor Q12, the resistor R15, and the transistor FET1. This causes a gate slope of the high-potential signal VGH1 to be adjusted. Further, at this point in time, the transistor Q11 is turned OFF.

On the other hand, when the transistor FET1 is OFF, the transistor Q11 is turned ON by an electric current outputted from the diode D1 via its cathode and flowing through the resistor R14. This causes the high-potential signal VGH1, whose falling edges are inclined, to be outputted to the scanning line driving circuit 5a.

The inclination of discharge is determined according to a load of the liquid crystal display panel 2 with respect to the high-potential signal VGH1 and the ON resistance of the entire path constituted by the diode D1, the transistor Q12, the resistor R15, and the transistor FET1, and this inclination serves as the inclination of a gate slope.

In this way, the length of time from the start to end of a falling edge of the high-potential signal VGH1 can be controlled in accordance with the pulse width of the pulse signal Ps.

Further, the angle of inclination of a falling edge of the high-potential signal VGH1 can be controlled in accordance with the value of the voltage VA1.

For example, when the voltage VA1 is fixed at 1.7 V, the high-potential signal VGH1 drops in potential to 16 V over the same length of time that the high-potential signal VGH1 falls, and is outputted to the scanning line driving circuit 5a. Alternatively, when the voltage VA1 is fixed at 0.1 V, the high-potential signal VGH1 drops in potential to 24 V over the same length of time that the high-potential signal VGH1 falls, and is outputted to the scanning line driving circuit 5a.

Thus, the constant-current circuits VR1 and VR2 vary the amounts of decrease in potential of the high-potential signals VGH1 in accordance with the values of resistance of the digital potentiometers R-DCP1 and R-DCP2, respectively. This makes it possible to vary the amounts of decrease in potential of the high-potential signals VGH1 by changing the values of resistance of the digital potentiometers R-DCP1 and R-DCP2, respectively.

Thus, since the falling edges of the high-potential signals VGH1 can be inclined by changing the values of resistance of the digital potentiometers R-DCP1 and R-DCP2, respectively, the inclination of falling edges of gate signals that are outputted to each separate scanning line can be easily equalized.

The transistor Q11 outputs the high-potential signal VGH1, the inclination of whose falling edges has been adjusted, via its emitter to the slope adjustment circuit 15a.

Upon receiving the high-potential signal VGH1, the inclination of whose falling edges has been adjusted, the slope adjustment circuit 15a generates a gate signal from the high-potential signal VGH1 and a low-potential signal VGL inputted from the control circuit 8.

(d) of FIG. 3 shows a gate signal Gt generated by the slope adjustment circuit 15a.

Then, the slope adjustment circuit 15a outputs a generated gate signal to each of the groups of scanning lines Gia and Gib, whereby the driving of each pixel PIX is controlled.

In the slope adjustment circuit 15b, normally, the value of resistance of the digital potentiometer R-CDP2 is adjusted by the step RW2 to be equal to the value of resistance of the digital potentiometer R-CDP1 of the slope adjustment circuit 15a.

However, there are often variations in parasitic capacitance or the like on wires among liquid crystal display panels 2 produced.

In such a case, the value of resistance of the digital potentiometer R-CDP2 can be adjusted by adjusting the step RW2. This causes the voltage VA2 of the wire A2 to change.

(e) of FIG. 3 shows the voltage VA2 of the wire A2. As shown in (e) of FIG. 3, it is assumed in the present embodiment that as with the voltage VA1, the voltage VA2 can be set at a value in the range of 0.1 V to 1.7 V by adjusting the value of resistance of the digital potentiometer R-DCP2. The value of the voltage VA2 is adjusted so that the minimum value of the high-potential signal VGH2 is equal to the minimum value of the high-potential signal VGH1.

Since a change in the voltage VA2 leads to a change in the voltage VB2 of the wire B2 accordingly, the value of ON resistance of the transistor Q22, i.e., the value of gate slope resistance of the slope adjustment circuit 15b (value of a combination of the value of ON resistance of the transistor Q22 and the value of resistance of the resistor R25) changes.

Thus, adjustment of the step RW2 causes a change in the value of gate slope resistance of the slope adjustment circuit 15b. This makes it possible to adjust the inclination of a gate slope of the high-potential signal VGH2. This makes it possible to make a slight adjustment to the quantity of electric charge for charging the liquid crystal display panel 2.

(f) of FIG. 3 shows the high-potential signal VGH2 outputted from the slope adjustment circuit 15b.

As shown in (f) of FIG. 3, the voltage of the high-potential signal VGH2 when the power is turned on is 35 V. Input of the pulse signal Ps at the H level to the transistor FET2 causes the high-potential signal VGH2 to start falling and linearly decrease in potential. Then, input of the pulse signal Ps at the L level to the transistor FET2 causes the high-potential signal VGH2 to finish falling and rise in potential from 20 V to 35 V.

It should be noted here that in a case where the liquid crystal display panel 2 has a large area, for example, there may be an in-plane distribution of wiring capacity, wiring resistance, etc. within the liquid crystal display panel 2. Further, those circuits constituting the slope adjustment circuits 15a and 15b vary from one circuit to another. For this reason, there is a case where the minimum value of a falling edge of the high-potential signal VGH2 cannot be made equal to the minimum value of a falling edge of the high-potential signal VGH1 even by setting the value of resistance of the digital potentiometer R-DCP2 to be equal to the value of resistance of the digital potentiometer R-DCP1.

Figure 4:
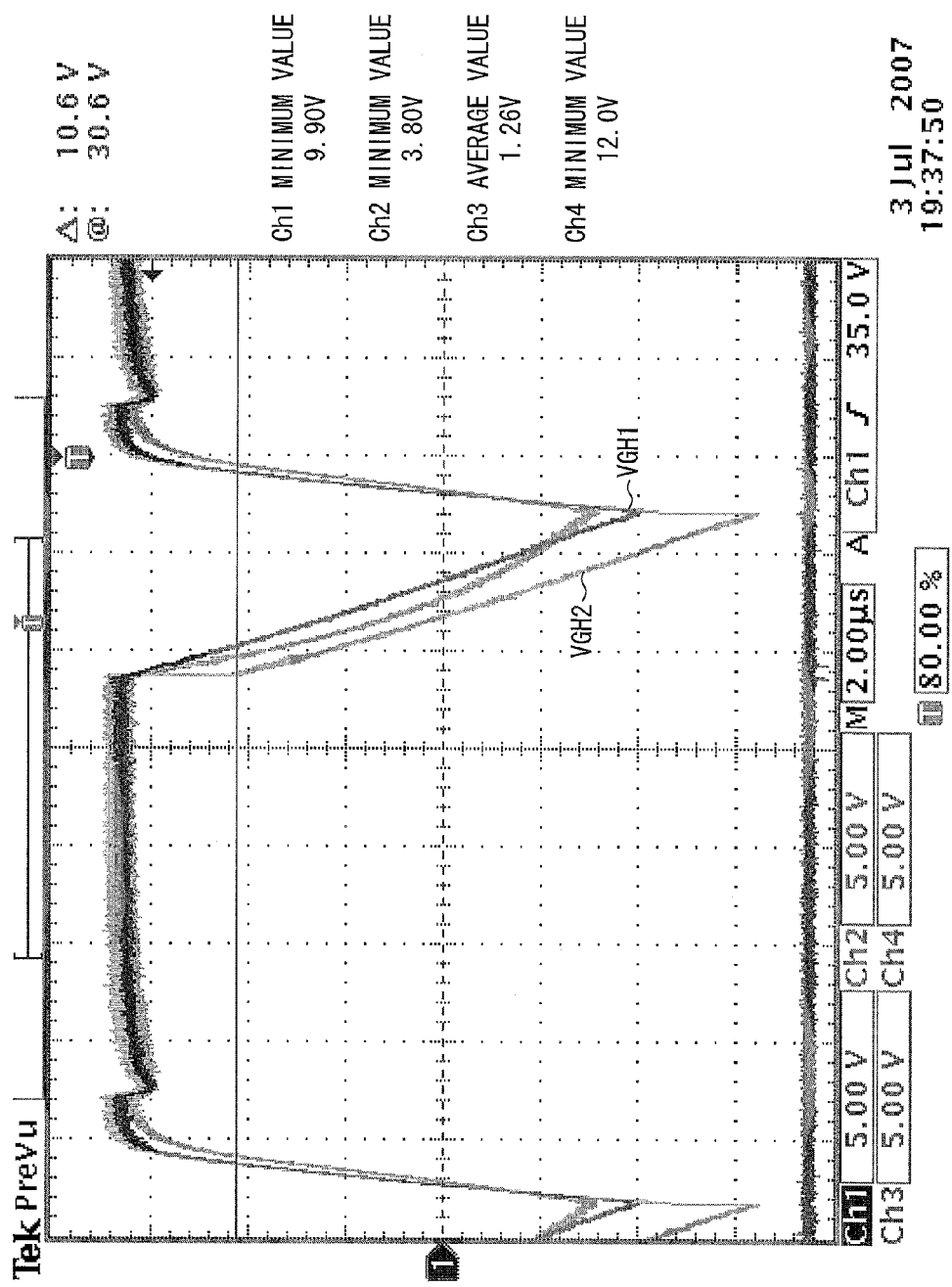
FIG. 4 is a diagram showing the waveforms of high-potential signals outputted from the slope adjustment circuits.

FIG. 4 is a diagram showing the waveforms of the high-potential signals VGH1 and VGH2. FIG. 4 shows that the minimum value of the voltage of the high-potential signal VGH2 is smaller than the minimum value of the voltage of the high-potential signal VGH1.

This is because the value of gate slope resistance of the slope adjustment circuit 15b is lower than the value of gate slope resistance of the slope adjustment circuit 15a.

Figure 5:
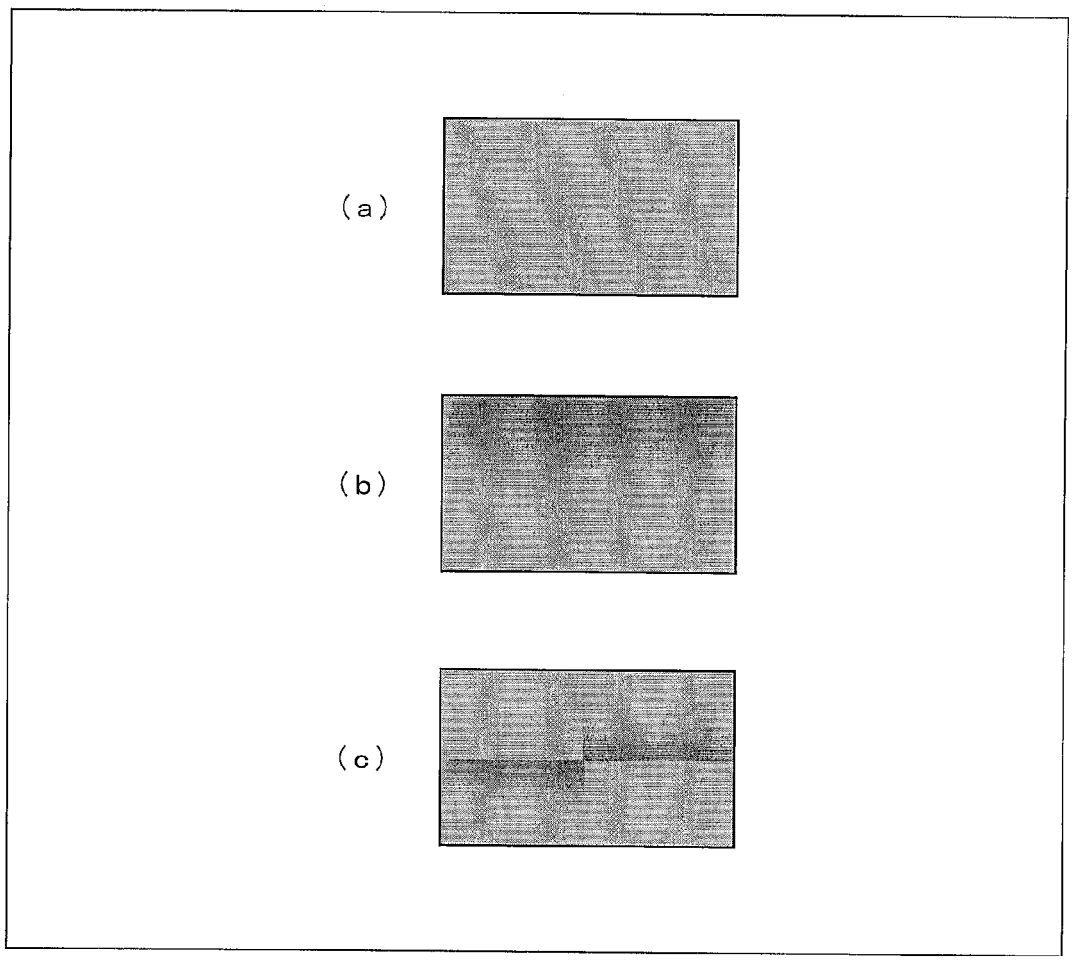
FIG. 5 is a diagram showing the appearance of screen images for inspection of the same low-tone color as displayed in the step of inspecting a liquid crystal display panel.

FIG. 5 is a diagram showing the appearance of screen images for inspection of the same low-tone color as displayed in the step of inspecting the liquid crystal display panel 2.

(a) of FIG. 5 shows a normal display screen image. (b) and (c) of FIG. 5 show display screen images on liquid crystal panels exhibiting partial luminance unevenness.

Such luminance unevenness as that shown in (b) and (c) of FIG. 5 is found in approximately 30% of liquid crystal panels, although there is a certain degree of difference of symptoms depending on the position of imposition within a mother glass from which the TFT substrate and the counter substrate of each liquid crystal display panel were cut out and on the production lot.

As mentioned above, the liquid crystal display device 1 makes it possible to adjust the values of resistance of the digital potentiometers R-DCP1 and R-DCP2 and thereby adjust gate slope waveforms so that the effective values (i.e., the voltages VB1 and VB2) of charging are uniformed.

This makes it possible to equalize the minimum values of potential of falling edges of the high-potential signals VGH1 and VGH2 respectively outputted from the plurality of slope adjustment circuits 15a and 15b. This makes it possible to equalize the minimum values of gate slopes of gate signals that are separately outputted to the groups of scanning lines Gia and Gib.

This makes it possible to output, for each of the groups of scanning lines Gia and Gib, a gate signal whose falling edge is less distorted, i.e., to adjust the gate slope waveforms of gate signals that are outputted to the groups of scanning lines Gia and Gib for which the slope adjustment circuits 15a and 15b are respectively responsible.

For this reason, the luminance of a display region containing pixels PIX whose driving is controlled by each separate one of the groups of scanning lines Gia and Gib is controlled with that region considered as a whole. This makes it possible to prevent the occurrence of luminance unevenness in each display region.

In the case of occurrence of luminance unevenness in the inspecting step, there are two types of luminance unevenness, depending on how the groups of scanning lines Gia and Gib of the liquid crystal display panel 2 are divided from each other, namely (i) luminance unevenness that is conspicuous in the part where the groups of scanning lines Gia and Gib are divided from each other and (ii) luminance unevenness that is conspicuous in a part remote from the part where the groups of scanning lines Gia and Gib are divided from each other.

Even in such a case, by shifting the luminance of a display region exhibiting luminance unevenness, of those display regions in the display region 3 in which the groups of scanning lines Gia and Gib are respectively responsible for driving, a defective display due to luminance unevenness can be eliminated from the display region 3 as a whole.

Thus, in the liquid crystal display device 1, luminance unevenness can be alleviated, and display properties can be improved. That is, a normal display screen image can be displayed as shown in (a) of FIG. 5.

In the present embodiment, only the value of the digital potentiometer R-DCP2 is adjusted while the value of resistance of the digital potentiometer R-DCP1 is fixed. However, the value of the digital potentiometer R-DCP1 may be adjusted while the value of resistance of the digital potentiometer R-DCP2 is fixed. Alternatively, both the values of resistance of the digital potentiometers R-DCP1 and R-DCP2 may be adjusted. In any of these ways, the gate slope waveforms of the high-potential signals VGH1 and VGH2 can be adjusted.

The liquid crystal display device 1 has been described by taking, as an example, a case where the two groups of scanning lines Gia and Gib are divided from each other and arranged one above the other (along a vertical direction). However, more precise adjustments can be made by providing three or more groups of scanning lines Gia and Gib divided from one another, providing each of them with a scanning line driving circuit and a slope adjustment circuit, and adjusting a gate slope waveform that is outputted from the slope adjustment circuit.

For example, the adjustment of gate slope waveforms of a large-sized liquid crystal display panel is facilitated by dividing the display region 3 into three regions, namely an upper region, a middle region, and a lower region, and adjusting the upper and lower regions with reference to the middle region.

Alternatively, the liquid crystal display panel may be divided into a left region and a right region (along the direction along which the group of scanning lines Gib extend; horizontal direction), and while fixing the value of resistance the digital potentiometer of the slope adjustment circuit corresponding to either of the left and right regions, the value of resistance of the digital potentiometer of the slope adjustment circuit corresponding to the other region may be adjusted.

Alternatively, the liquid crystal display panel may be divided into four quadrant regions, and while fixing the value of resistance of the digital potentiometer of the slope adjustment circuit corresponding to the upper left region, the values of resistance of the digital potentiometers of the slope adjustment circuits corresponding the three remaining regions may be adjusted.

Figure 6:
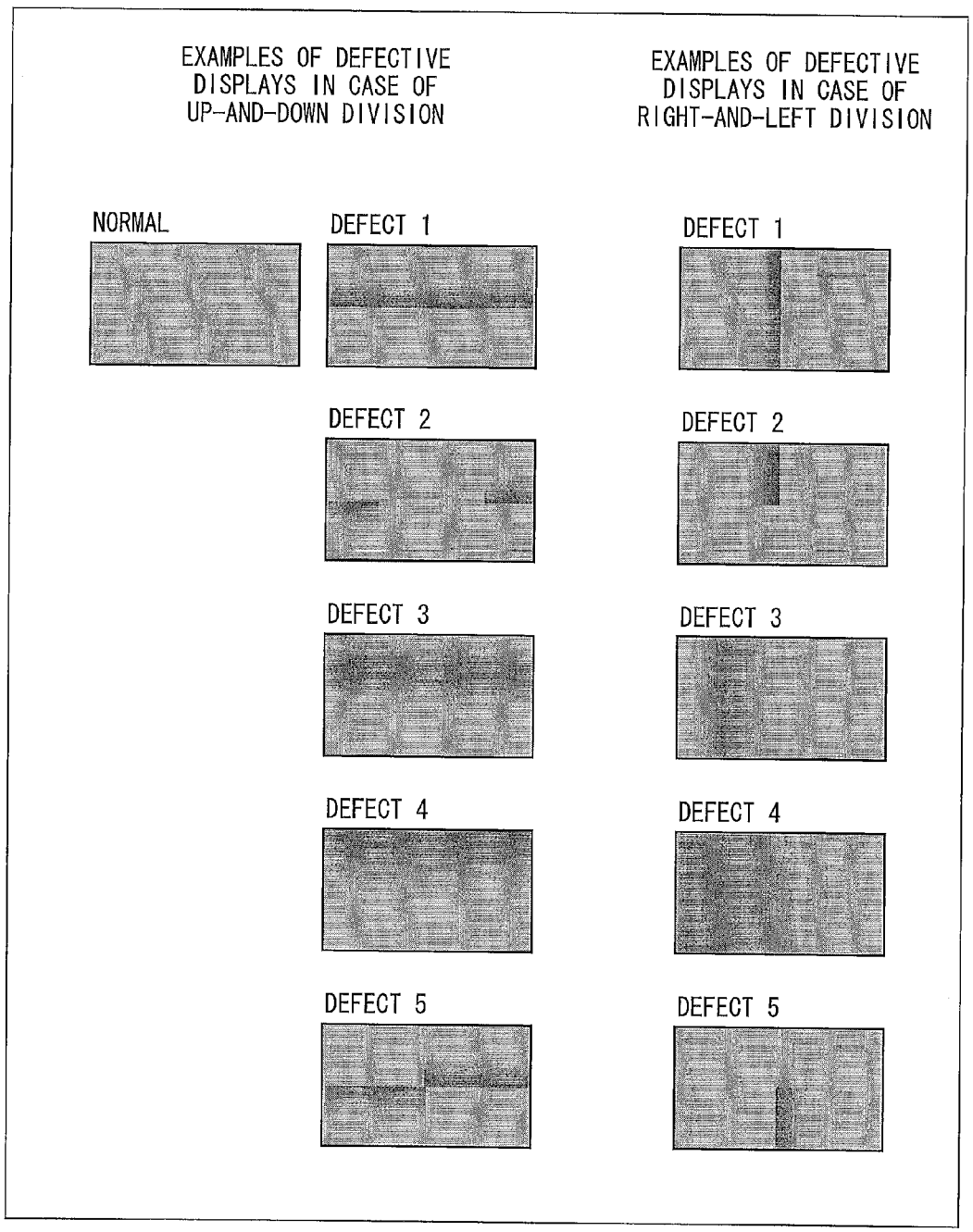
FIG. 6 is a diagram showing display screen images on liquid crystal panels exhibiting luminance unevenness.
Figure 7:
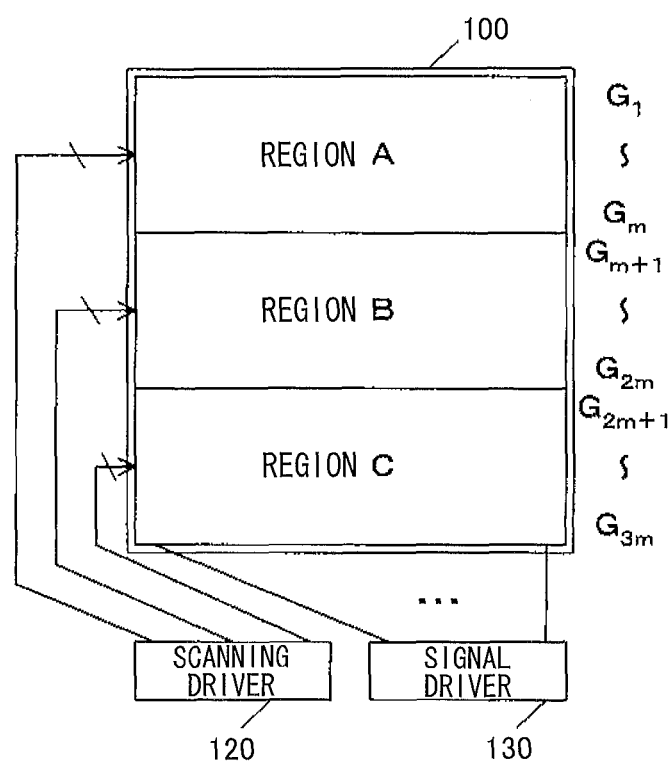
FIG. 7 is a diagram schematically showing the locations of a conventional display panel, its scanning driver, and its signal driver.
Figure 8:
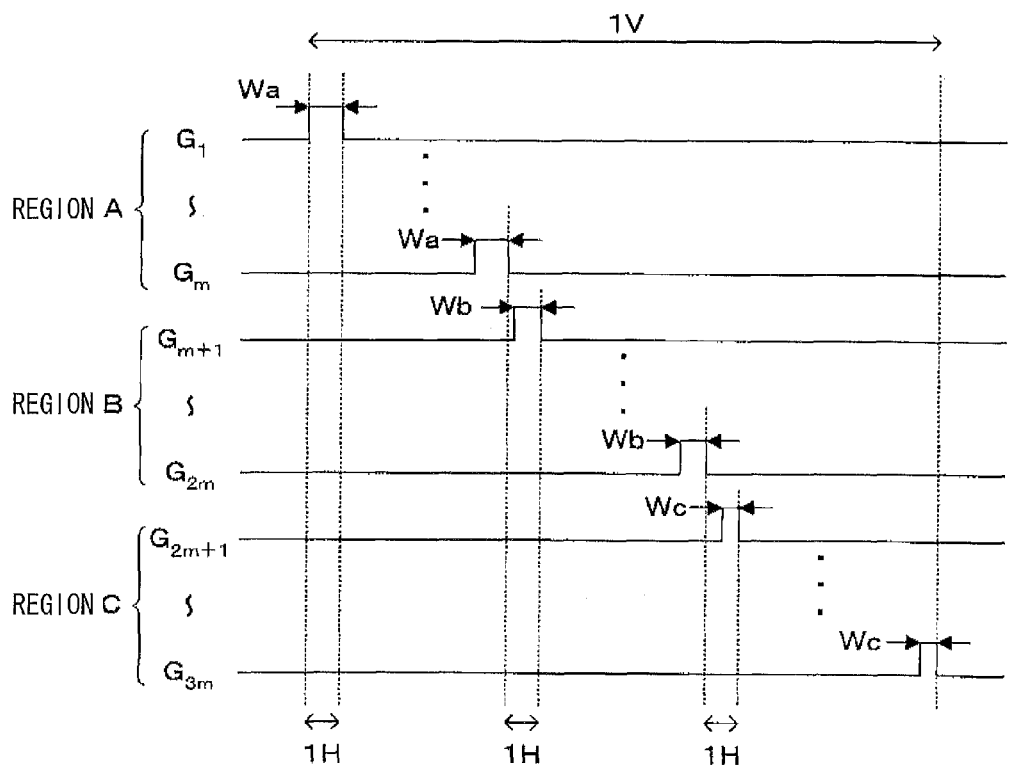
FIG. 8 is a diagram showing the waveforms of scanning signals that are applied to scanning lines of the conventional display panel.

FIG. 6 is a diagram showing display screen images on liquid crystal panels exhibiting luminance unevenness. As shown in FIG. 6, the liquid crystal display device 1 exhibits various types of luminance unevenness, depending on how the groups of scanning lines Gia and Gib are divided from each other.

In FIG. 6, the left display screen image represents an example of a normal display screen image, the middle column of display screen images represents examples of defective displays in the case of up-and-down division, and the right column of display screen images represents examples of defective displays in the case of right-and-left division.

(Way of Thinking in Terms of Designing the Slope Adjustment Circuits)

Next, a way of thinking in terms of designing the slope adjustment circuits is described with reference to FIG. 2.

First, the slope adjustment circuit 15a is described.

First, the range of adjustment of the sum of the value of resistance (which is denoted as R14) of the resistor R14 and the value of resistance (i.e., the value of gate slope resistance, which is denoted as VR1) is determined according to the design value of the liquid crystal display panel 2.

Once the range of adjustment of VR1 is determined, the range of adjustment of the voltage VB1 is determined according to VR1=(ON resistance of the transistor Q12)+Value of resistance (which is denoted as R15) of the resistor R15.

Further, the range of adjustment of the voltage VB1 and the range of adjustment of the voltage VA1 take on the same values.

The value of resistance (which is denoted as R11) of the resistor R11, the value of resistance (which is denoted as R12) of the resistor R12, and the value of resistance (which is denoted as R13) of the resistor R13 are determined according to the range of adjustment of the voltage VA1 and the value of the power supply voltage Vcc (which is denoted as Vcc).

It should be noted that the resistor R11, the resistor R12, the resistor R13, the digital potentiometer R-DCP1 are circuits for generating the voltage VA1 of the wire A1.

If RH1 is the value of the voltage RH1, RL1 is the value of the voltage RL1, and (R-CDP1) is the value of resistance of the digital potentiometer R-DCP1, the following expressions hold:

$$RH1 = Vcc \times (RM1+R13)/(R11+RM1+R13)$$

$$RL1 = Vcc \times (R13)/(R11+RM1+R13)$$

$$RM1 = R12 \times (R\text{-}DCP1)/(R12+(R\text{-}DCP1))$$

If $R12 \ll (R\text{-}DCP1)$, $RM1 = R12$, $$RH1 = Vcc \times (R12+R13)/(R11+R12+R13)$$

$$RL1 = Vcc \times (R13)/(R11+R12+R13).$$

This is how each circuit of the slope adjustment circuit 15a can be designed.

As described below, the design of the slope adjustment circuit 15b can be considered in the same manner.

The resistor R21, the resistor R22, the resistor R23, the digital potentiometer R-DCP2 are circuits for generating the voltage VA2 of the wire A2.

If RH2 is the value of the voltage RH2, RL2 is the value of the voltage RL2, and (R-CDP2) is the value of resistance of the digital potentiometer R-DCP2, the following expressions hold:

$$RH2 = Vcc \times (RM2+R23)/(R21+RM2+R23)$$

$$RL2 = Vcc \times (R23)/(R21+RM2+R23)$$

$$RM2 = R22 \times (R\text{-}DCP2)/(R22+(R\text{-}DCP2))$$

If $R22 \ll (R\text{-}DCP2)$, $RM2=R22$, $$RH2 = Vcc \times (R22+R23)/(R21+R22+R23)$$

$$RL2 = Vcc \times (R23)/(R21+R22+R23).$$

This is how each circuit of the slope adjustment circuit 15b can be designed.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a liquid crystal display device of the present invention includes: scanning line driving sections which generate scanning signals; and a plurality of scanning lines via which the scanning signals generated by the scanning line driving sections are outputted to a plurality of pixels, the scanning line driving sections being disposed for each separate one of a plurality of groups of scanning lines which constitute the plurality of scanning lines, the liquid crystal display device further comprising potential control circuits which incline, for each separate one of the groups of scanning lines, falling edges of scanning signal generating signals in accordance with which the scanning signals are generated, the potential control circuits being placed in front of the scanning line driving sections, respectively, the scanning signal generating signals being composed of pulse waves.

According to the foregoing configuration, the scanning line driving sections are disposed for each separate one of a plurality of groups of scanning lines which constitute the plurality of scanning lines. This makes it possible to reduce the number of scanning lines that are driven by a single scanning line driving section, thus making it possible to prevent distortion of falling edges of gate signals that are outputted to the scanning lines.

According to the foregoing configuration, the liquid crystal display device includes potential control circuits which incline falling edges of scanning signal generating signals in accordance with which the scanning signals are generated, the potential control circuits being placed in front of the scanning line driving sections, respectively, the scanning signal generating signals being composed of pulse waves.

This allows the scanning line driving sections to acquire the scanning signal generating signals composed of pulse waves whose falling edges are inclined by the slope adjustment circuits. Then, the scanning line driving sections generate scanning signals from the scanning signal generating signals thus acquired. For this reason, the shapes of pulse waves of the scanning signals generated by the scanning line driving sections are also shapes having inclined falling edges. Thus, the scanning signals generated by the scanning line driving sections have the shapes of pulse waves whose falling edges are inclined, and as such, can make it harder for the falling edges to be distorted.

Further, the slope adjustment circuits incline the falling edges of the scanning signal generating signals for the groups of scanning lines, respectively. For this reason, the slopes of the falling edges of the scanning signal generating signals can be optimized in accordance with parasitic capacitors and the like that are formed in each of the plurality of groups of scanning lines. This makes it possible to prevent a sloping part of a falling edge of a gate signal that is outputted to each scanning line from varying between the groups of scanning lines.

Thus, a liquid crystal display device can be provided which prevents the occurrence of luminance unevenness in each display region by adjusting a falling edge of a scanning signal for each group of scanning lines.

The liquid crystal display device of the present invention is preferably configured such that the plurality of potential control circuits incline the falling edges of the scanning signal generating signals and output, to the scanning line driving sections, the scanning signal generating signals whose falling edges have been inclined, respectively. The foregoing configuration allows the scanning line driving sections to inline falling edges of the scanning signals for each of the groups of scanning lines. This makes it possible to equalize sloping parts of falling edges of gate signals that are outputted to each separate scanning line.

The liquid crystal display device of the present invention is preferably configured such that the potential control circuits include variable resistors for determining angles of inclination of the falling edges of the scanning signal generating signals, respectively. According to the foregoing configuration, the angles of inclination of the falling edges of the scanning signal generating signals can be determined by changing the values of resistance of the variable resistors. This makes it possible to equalize sloping parts of falling edges of gate signals that are outputted to each separate scanning line.

The liquid crystal display device of the present invention is preferably configured such that the potential control circuits include constant-current circuits for reducing potentials of the scanning signal generating signals, respectively. According to the foregoing configuration, the falling edges of the scanning signal generating signals can be inclined by the current-constant circuits.

The liquid crystal display device of the present invention is preferably configured such that the constant-current circuits vary amounts of decrease in potential of the scanning signal generating signals in accordance with values of resistance of the variable resistors, respectively. According to the foregoing configuration, the amounts of decrease in potential of the scanning signal generating signals can be varied by changing the values of resistance of the variable resistor. Thus, the falling edges of the scanning signal generating signals can be inclined by changing the values of resistance of the variable resistors. This makes it possible to equalize sloping parts of falling edges of gate signals that are outputted to each separate scanning line.

The liquid crystal display device of the present invention is preferably configured such that the constant-current circuits include switches which switch between an operating state and a nonoperating state of the constant-current circuits, respectively. According to the foregoing configuration, whether or not to reduce potentials of the scanning signal generating signals can be selected by switching the switches. This makes it possible to control the potentials of the scanning signal generating signals.

The liquid crystal display device of the present invention is preferably configured such that the scanning signal generating signals respectively outputted from the plurality of potential control circuits are equal in terms of minimum values of potential of falling edges. This makes it possible to equalize the minimum values of sloping parts of scanning signals that are separately outputted to the groups of scanning lines. This makes it possible to output, for each of the groups of scanning lines, a scanning signal whose falling edge is less distorted. This makes it possible to prevent luminance unevenness.

INDUSTRIAL APPLICABILITY

The present invention makes it possible to adjust, for each group of scanning lines, the inclination of a falling edge of a gate signal that is outputted to the group of scanning lines, and as such, is suitably applicable, in particular, to a large-screen liquid crystal display device.

REFERENCE SIGNS LIST

1 Liquid crystal display device
2 Liquid crystal display panel
3 Display region
FET1, FET2 Transistor (switch)
VGH1, VGH2 High-potential signal (scanning signal generating signal)
R-DCP1, R-DCP1 Digital potentiometer (variable resistor)
5a, 5b Scanning line driving circuit (scanning line driving section)
15a, 15b Slope adjustment circuit (potential control circuit)
Gia, Gib Group of scanning lines
Gt Gate signal (scanning signal)
R12 Resistor (variable resistor)
VR1, VR2 Constant-current circuit

The invention claimed is:

1. A liquid crystal display device, comprising:
scanning line driving sections which are configured or programmed to generate scanning signals; and
a plurality of scanning lines via which the scanning signals generated by the scanning line driving sections are outputted to a plurality of pixels, wherein
the scanning line driving sections are provided for each separate one of a plurality of groups of scanning lines which define the plurality of scanning lines,
the liquid crystal display device further comprising potential control circuits which are configured or programmed to incline, for each separate one of the plurality of groups of scanning lines, falling edges of scanning signal generating signals in accordance with which the scanning signals are generated, the potential control circuits being located in front of the scanning line driving sections, respectively, the scanning signal generating signals being defined by pulse waves,
the potential control circuits including:
variable resistors configured to determine angles of inclination of the falling edges of the scanning signal generating signals, respectively; and
constant-current circuits configured or programmed to reduce potentials of the scanning signal generating signals, respectively, by causing charges of the scanning signal generating signals being supplied to the scanning line driving sections to be removed, respectively, and
the constant-current circuits are configured or programmed to vary amounts of decrease in potential of the scanning signal generating signals by changing amounts of the charges of the scanning signal generating signals, which changes are removed, in accordance with values of resistance of the variable resistors, respectively.

2. The liquid crystal display device as set forth in claim 1, wherein the scanning signal generating signals respectively outputted from the plurality of potential control circuits are equal in terms of minimum values of potential of falling edges.

3. The liquid crystal display device as set forth in claim 1, wherein the plurality of potential control circuits incline the falling edges of the scanning signal generating signals and output, to the scanning line driving sections, the scanning signal generating signals whose falling edges have been inclined, respectively.

4. The liquid crystal display device as set forth in claim 1, wherein:
the potential control circuits further include first transistors, respectively;
the constant-current circuits include operational amplifiers and second transistors, respectively;
the first transistors include (i) collector terminals, (ii) emitter terminals, and (iii) base terminals, respectively;
the second transistors include (a) collector terminals, (b) emitter terminals which are directly or indirectly grounded, and (c) base terminals, respectively;
the scanning signal generating signals are applied to the collector terminals of the first transistors, respectively, and the emitter terminals of the first transistors are connected to the scanning line driving circuits and the collector terminals of the second transistors, respectively; and
the operational amplifiers include input terminals, connected to the variable resistors, and output terminals, connected to the base terminals of the second transistors, respectively.

5. A liquid crystal display device, comprising:
scanning line driving sections which are configured or programmed to generate scanning signals; and
a plurality of scanning lines via which the scanning signals generated by the scanning line driving sections are outputted to a plurality of pixels, wherein
the scanning line driving sections are provided for each separate one of a plurality of groups of scanning lines which define the plurality of scanning lines,
the liquid crystal display device further comprising potential control circuits which are configured or programmed to incline, for each separate one of the plurality of groups of scanning lines, falling edges of scanning signal generating signals in accordance with which the scanning signals are generated, the potential control circuits being located in front of the scanning line driving sections, respectively, the scanning signal generating signals being defined by pulse waves,
the potential control circuits including:
variable resistors configured to determine angles of inclination of the falling edges of the scanning signal generating signals, respectively;
constant-current circuits configured or programmed to reduce potentials of the scanning signal generating signals, respectively, by causing charges of the scanning signal generating signals being supplied to the scanning line driving sections to be removed, respectively; and
switches which are configured or programmed to switch between an operating state and a non-operating state of the constant-current circuits, respectively.

6. The liquid crystal display device as set forth in claim 5, wherein the scanning signal generating signals respectively outputted from the plurality of potential control circuits are equal in terms of minimum values of potential of falling edges.

7. The liquid crystal display device as set forth in claim 5, wherein the plurality of potential control circuits incline the falling edges of the scanning signal generating signals and output, to the scanning line driving sections, the scanning signal generating signals whose falling edges have been inclined, respectively.

8. The liquid crystal display device as set forth in claim 5, wherein:
- the potential control circuits further include first transistors, respectively;
- the constant-current circuits include operational amplifiers and second transistors, respectively;
- the first transistors include (i) collector terminals, (ii) emitter terminals, and (iii) base terminals, respectively;
- the second transistors include (a) collector terminals, (b) emitter terminals, and (c) base terminals, respectively;
- the scanning signal generating signals are applied to the collector terminals of the first transistors, respectively, and the emitter terminals of the first transistors are connected to the scanning line driving circuits and the collector terminals of the second transistors, respectively;
- the operational amplifiers include input terminals, connected to the variable resistors, and output terminals, connected to the base terminals of the second transistors, respectively; and
- the emitter terminals of the second transistors are connected to first terminals of the switches, respectively, and second terminals of the switches are grounded.

* * * * *